United States Patent
Joshi et al.

(10) Patent No.: US 9,154,807 B2
(45) Date of Patent: Oct. 6, 2015

(54) INCLUSION OF SWITCHED INTERPOLATION FILTER COEFFICIENTS IN A COMPRESSED BIT-STREAM

(75) Inventors: Rajan L. Joshi, San Diego, CA (US); Marta Karczewicz, San Diego, CA (US); Rahul P. Panchal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 418 days.

(21) Appl. No.: 13/079,166

(22) Filed: Apr. 4, 2011

(65) Prior Publication Data

US 2011/0317764 A1 Dec. 29, 2011

Related U.S. Application Data

(60) Provisional application No. 61/358,590, filed on Jun. 25, 2010, provisional application No. 61/363,175, filed on Jul. 9, 2010.

(51) Int. Cl.
*H04N 7/26* (2006.01)
*H04N 19/523* (2014.01)
(Continued)

(52) U.S. Cl.
CPC ........... *H04N 19/523* (2014.11); *H04N 19/117* (2014.11); *H04N 19/172* (2014.11); *H04N 19/176* (2014.11); *H04N 19/70* (2014.11); *H04N 19/82* (2014.11)

(58) Field of Classification Search
CPC .............. H04N 7/50; H04N 19/00884; H04N 19/00739
USPC .................................................... 375/240.15
See application file for complete search history.

(56) References Cited

U.S. PATENT DOCUMENTS 8,442,124 B2 * 5/2013 Rodriguez ............... 375/240.26
2004/0062307 A1 4/2004 Hallapuro et al.
(Continued)

FOREIGN PATENT DOCUMENTS

JP 2008536414 A 9/2008
JP 2011001234 A 1/2011
(Continued)

OTHER PUBLICATIONS

International Search Report and Written Opinion—PCT/US2011/041892, ISA/EPO—Aug. 18, 2011.
(Continued)

*Primary Examiner* — Jay Patel
*Assistant Examiner* — Francis G Geroleo
(74) *Attorney, Agent, or Firm* — Todd E. Marlette

(57) ABSTRACT

In one example, an encoder may apply a plurality of pre-defined interpolation filters to units of video data, such as frames of reference video, in order to generate a plurality of different interpolated prediction data. The encoder may also at times determine that a new interpolation filter or set of interpolation filters might improve coding quality by either improving video compression or improving reconstructed image quality. The encoder may also signal to a video decoder whether one of the pre-defined interpolation filters was used or a new set of interpolation filters was used. The encoder may also signal to a video decoder whether to continue using the new set of interpolation filters, or whether to revert back to using the pre-defined set of interpolation filters. A video decoder can decode video data based on data received from the video encoder.

62 Claims, 12 Drawing Sheets

(51) Int. Cl.
*H04N 19/176* (2014.01)
*H04N 19/70* (2014.01)
*H04N 19/172* (2014.01)
*H04N 19/117* (2014.01)
*H04N 19/82* (2014.01)

(56) References Cited

U.S. PATENT DOCUMENTS

| | | |
|---|---|---|
| 2005/0013372 A1 | 1/2005 | Srinivasan |
| 2006/0153294 A1 | 7/2006 | Wang et al. |
| 2008/0175322 A1 | 7/2008 | Lee et al. |
| 2010/0002770 A1 | 1/2010 | Motta et al. |
| 2010/0111182 A1 | 5/2010 | Karczewicz et al. |
| 2010/0254450 A1 | 10/2010 | Narroschke et al. |
| 2012/0082242 A1* | 4/2012 | Narroschke et al. ..... 375/240.25 |
| 2012/0147959 A1 | 6/2012 | Amano et al. |
| 2013/0142262 A1* | 6/2013 | Ye et al. ............... 375/240.16 |

FOREIGN PATENT DOCUMENTS

| | | |
|---|---|---|
| TW | 1311443 B | 6/2009 |
| WO | WO03058945 A2 | 7/2003 |
| WO | 2009047917 A1 | 4/2009 |
| WO | WO2009126911 A1 | 10/2009 |
| WO | 2010001614 A1 | 1/2010 |
| WO | WO2010034204 A1 | 4/2010 |
| WO | 2011111341 A1 | 9/2011 |

OTHER PUBLICATIONS

Yuri Vatis et al.: "Syntax of adaptive filter coefficients in the KTA reference model" Joint Video Team (JVT) of ISO/IEC MPEG & ITU-T VCEG(ISO/IEC JTC1/SC29/WG11 and ITU-T SG16 Q6), XX, XX, No. VCEG-AF09, May 2, 2007, XP030003530.

Wedi: "New Results on Adaptive Interpolation Filter," Joint Video (ISO/IEC JTC1/SC29/WG11 and ITU-T SG16 Q6), XX, XX, No. JVT-0059, May 1, 2002, XP030005168.

Wedi T, "Adaptive Interpolation Filter with Reduced Complexity", [online], Jan. 17, 2005, Joint Video Team (JVT) of ISO/IEC MPEG & ITU-T VCEG (ISO/IEC JTC1/SC29/WG11 and ITU-T SG16 Q.6), Document: JVT-D052, [Searched on Oct. 30, 2013], Internet <URL: http://wftp3.itu.int/av-arch/jvt-site/2002_07_Klagenfurt/JVT-D052.doc>.

Wedi T, "Advanced Motion Compensated Prediction Methods", [online], Oct. 29, 2004, ITU-T Video Coding Experts Group (ITU-T SG16 Q.6), Document: VCEG-X10, [Searched on Oct. 30, 2013], Internet <URL: http://wftp3.itu.int/av-arch/video-site/0410_Pal/VCEG-X10.doc>.

Chono., K., et.al., "Modified Adaptive Interpolation Filter", [online], Jan. 17, 2005, Joint Video Team (JVT) of ISO/IEC MPEG & ITU-T VCEG (ISO/IEC JTC1/SC29/WG11 and ITU-T SG16 Q.6),Document: JVT-D078, Internet<URL:http://wftp3.itu.int/av-arch/jvt-site/2002_07_Klagenfurt/JVT-D078.zip>(Jul. 22-26,2002) "wftp3.itu.int—/av-arch/jvt-site/2002_07_Klagenfurt/", [online], Internet<URL:http://wftp3.itu.int/av-arch/jvt-site/2002_07_Klagenfurt/>, p. No. 1-27.

Huang, Y-W., et.al., "A Technical Description of MediaTek's Proposal to the JCT-VC CfP", Joint Collaborative Team on Video Coding (JCT-VC) of ITU-T SG16 WP3 and ISO/IEC JCT1/SC29/WG11, Document: JCTVC-A109, Status: Input Document to JCT-VC, Apr. 2010, pp. 1-41, Internet<URL:http//phenix.int-evry.fr/jct/doc_end_user/documents/1_Dresden/wg11/JCTVC-A109.zip>, (1-6, 15-21).

Okubo, S., "Impresss Standard Textbook Series—3rd Revision of H.264/AVC Textbook," 1st Edition, Jan. 1, 2009, Impress R&D, pp. 117-119, 326 and 332-336, ISBN: 978-4-8443-2664-9.

Zhang K., et.al., "Single-Pass Encoding Using Multiple Adaptive Interpolation Filters", [online], Apr. 11, 2009, ITU—Telecommunications Standardization Sector Study Group 16 Question 6 Video Coding Experts Group (VCEG), Document: VCEG-AK26, Internet<URL:http://wftp3.itu.int/av-arch/video-site/0904_Yok/VCEG-AK26.zip>(Apr. 15-18,2009)"wftp3.itu.int—/av-arch/video-site/0904_Yok/", [online], Internet<URL:http://wftp3.itu.int/av-arch/video-site/0904_Yok/, p. No. 1-7.

Index of/jct/doc_end_user/documents/1_Dresden/wg11, [online], Mar. 5, 2014, pp. 1-3.

Kameyama W., et al., "Impress Standard Textbook Series—Digital Broadcasting Textbook for IPTV Era," 1st Edition, Apr. 1, 2010, Impress R&D, pp. 102-106, ISBN: 978-4-8443-2853-7.

Okubo S., et al., "Impress Standard Textbook Series—3rd Revision of H264/AVC Textbook," 1st Edition, Jan. 1, 2009, Impress R&D, pp. 99-123, ISBN: 978-4-8443-2664-9.

Segall A., et al., "A Highly Efficient and Highly Parallel System for Video Coding", [online], Joint Collaborative Team on Video Coding (JCT-VC) of ITU-T SG16 WP3 and ISO/IEC JCT1/SC29/WG11, Apr. 23, 2010, Document: JCTVC-A105, pp. 1-47, URL: http://phenix.int-evry.fr/jct/doc_end_user/documents/1_Dresden/wg11/JCTVC-A105.zip.

Taiwan Search Report—TW100122316—TIPO—Apr. 26, 2014.

wftp3.itu-int-/av-arch/jvt-site/2002_05_Fairfax/, [online], Oct. 30, 2013, pp. 1-3.

wftp3.itu.int-/av-arch/jvt-site/2002_07_Klagenfurt/, [online], Oct. 30, 2013, pp. 1-3.

wftp3.itu.int-/av-arch/jvt-site/2002_07_Klagenfurt/, [online], Mar. 5, 2014, pp. 1-7.

wftp3.itu.int-/av-arch/video-site10419_Pal/, [online], Oct. 30, 2013, pp. 1-2.

wftp3.itu-int-/av-arch/video-site/0904_Yok/, [online], Mar. 5, 2014, pp. 1-2.

* cited by examiner

INCLUSION OF SWITCHED INTERPOLATION FILTER COEFFICIENTS IN A COMPRESSED BIT-STREAM

This application claims the benefit of U.S. Provisional Application 61/358,590 filed on Jun. 25, 2010, and U.S. Provisional Application 61/363,175 filed on Jul. 9, 2010, the entire contents each of which are incorporated herein by reference.

TECHNICAL FIELD

This disclosure relates to video compression, and more specifically to using interpolation filtering when encoding and decoding a video sequence bitstream.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, digital cameras, digital recording devices, video gaming devices, video game consoles, cellular or satellite radio telephones, smart phones, and the like. Digital video devices implement video compression techniques, such as MPEG-2, MPEG-4, or ITU-T H.264/MPEG-4, Part 10, Advanced Video Coding (AVC), to transmit and receive digital video information more efficiently. Video compression techniques may perform spatial prediction and/or temporal prediction to reduce or remove redundancy inherent in video sequences. New video standards, such as the HEVC standard being developed by the "Joint Collaborative Team—Video Coding" (JCTVC), which is a collaboration between MPEG and ITU-T, continue to emerge and evolve. This new standard is sometimes referred to as H.265.

Block based inter-coding is a very useful coding technique that relies on temporal prediction to reduce or remove temporal redundancy between video blocks of successive coded units of a video sequence. The coded units may comprise video frames, slices of video frames, groups of pictures, or another defined unit of video blocks. For inter-coding, the video encoder performs motion estimation and motion compensation to track the movement of corresponding video blocks of two or more adjacent coded units. Motion estimation generates motion vectors, which indicate the displacement of video blocks relative to corresponding prediction video blocks in one or more reference frames or other coded units. Motion compensation uses the motion vectors to generate prediction video blocks from the reference frame or other coded unit. After motion compensation, residual video blocks are formed by subtracting prediction video blocks from the original video blocks being coded.

The video encoder may also apply transform, quantization and entropy coding processes to further reduce the bit rate associated with communication of residual blocks. Transform techniques may comprise discrete cosine transforms (DCTs) or conceptually similar processes. Alternatively, wavelet transforms, integer transforms, or other types of transforms may be used. In a DCT process, as an example, a set of pixel values are converted into transform coefficients, which may represent the energy of the pixel values in the frequency domain. Quantization is applied to the transform coefficients, and generally involves a process that limits the number of bits associated with any given transform coefficient. Entropy coding comprises one or more processes that collectively compress a sequence of quantized transform coefficients. Examples of entropy coding include but are not limited to content adaptive variable length coding (CAVLC) and context adaptive binary arithmetic coding (CABAC).

A coded video block may be represented by prediction information that can be used to create or identify a predictive block, and a residual block of data indicative of differences between the block being coded and the predictive block. The prediction information may comprise the one or more motion vectors that are used to identify the predictive block of data. Given the motion vectors, the decoder is able to reconstruct the predictive blocks that were used to code the residual. Thus, given a set of residual blocks and a set of motion vectors (and possibly some additional syntax), the decoder may be able to reconstruct a video frame that was originally encoded. Inter-coding based on motion estimation and motion compensation can achieve very good compression because successive video frames or other types of coded units are often very similar. An encoded video sequence may comprise blocks of residual data, motion vectors, and possibly other types of syntax.

Interpolation techniques have been developed in order to improve the level of compression that can be achieved in inter-coding. In this case, the predictive data generated during motion compensation, which is used to code a video block, may be interpolated from the pixels of video blocks of the video frame or other coded unit used in motion estimation. Interpolation is often performed to generate predictive half-pixel values (half-pel) and predictive quarter-pixel values (quarter-pel). Such interpolation often generates predictive blocks that are even more similar to the video blocks being coded than the actual video blocks of the predictive frame or other coded unit used in the video coding.

SUMMARY

In general, this disclosure describes interpolation techniques performed by an encoder and a decoder during the motion compensation process of video coding. According to the techniques of this disclosure, an encoder may apply a plurality of pre-defined interpolation filters to units of video data, such as frames of reference video, in order to generate a plurality of different interpolated prediction data. The encoder may also at times determine that a new interpolation filter or set of interpolation filters could improve coding quality by either improving video compression or improving reconstructed image quality. This disclosure describes techniques for signaling to a video decoder whether one of the pre-defined interpolation filters was used or a new set of interpolation filters was used. This disclosure further describes techniques for signaling to a video decoder whether to continue using the new set of interpolation filters, or whether to revert back to using the pre-defined set of interpolation filters.

In one example, this disclosure describes a method of encoding video data. The method comprises interpolating first pixel values for a first sub-unit of reference video to generate first prediction data, wherein interpolating the first pixel values is based on a first set of interpolation filters; generating a first syntax element associated with the first sub-unit of reference video to indicate that the first set of interpolation filters are defined in a syntax element associated with a unit of reference video comprising the first sub-unit of reference video; encoding the video data based on the first prediction data; and, generating an encoded bit stream that includes the encoded video data and the first syntax element.

In another example, this disclosure describes a method of decoding video data. The method comprises receiving in a video bit stream a unit of reference video, wherein the unit of reference video comprises a plurality of sub-units; identifying in the unit of reference a video a first syntax element, wherein the first syntax element is associated with a first sub-unit of the plurality of sub-units, and wherein the first syntax element signifies that a first set of interpolation filters are defined in a syntax element associated with the unit of reference video; interpolating first pixel values for the first sub-unit of the unit of reference video to generate first prediction data using the first set of interpolation filters; and, decoding the video data based at least in part on the first prediction data.

In another example, this disclosure describes an apparatus that encodes video data. The apparatus comprises a video encoder configured to: interpolate first pixel values for a first sub-unit of reference video to generate first prediction data, wherein interpolating the first pixel values is based on a first set of interpolation filters; generate a first syntax element associated with the first sub-unit of reference video to indicate that the first set of interpolation filters are defined in a syntax element associated with a unit of reference video comprising the first sub-unit of reference video; encode the video data based on the first prediction data; and, generate an encoded bit stream that includes the encoded video data and the first syntax element.

In another example, this disclosure describes an apparatus that decodes video data. The apparatus comprises a video decoder configured to: receive in a video bit stream a unit of reference video, wherein the unit of reference video comprises a plurality of sub-units; identify in the unit of reference a video a first syntax element, wherein the first syntax element is associated with a first sub-unit of the plurality of sub-units, and wherein the first syntax element signifies that a first set of interpolation filters are defined in a syntax element associated with the unit of reference video; interpolate first pixel values for the first sub-unit of the unit of reference video to generate first prediction data using the first set of interpolation filters; and, produce decoded video data based on the first prediction data.

In another example, this disclosure describes a computer-readable storage medium comprising instructions that upon execution in a processor cause the processor to: interpolate first pixel values for a first sub-unit of reference video to generate first prediction data, wherein interpolating the first pixel values is based on a first set of interpolation filters; generate a first syntax element associated with the first sub-unit of reference video to indicate that the first set of interpolation filters are defined in a syntax element associated with a unit of reference video comprising the first sub-unit of reference video; encode the video data based on the first prediction data; and, generate an encoded bit stream that includes the encoded video data and the first syntax element.

In another example, this disclosure describes a computer-readable storage medium comprising instructions that upon execution in a processor cause the processor to receive in a video bit stream a unit of reference video, wherein the unit of reference video comprises a plurality of sub-units; identify in the unit of reference a video a first syntax element, wherein the first syntax element is associated with a first sub-unit of the plurality of sub-units, and wherein the first syntax element signifies that a first set of interpolation filters are defined in a syntax element associated with the unit of reference video; interpolate first pixel values for the first sub-unit of the unit of reference video to generate first prediction data using the first set of interpolation filters; and, decode the video data based at least in part on the first prediction data.

In another example, this disclosure describes a device for encoding video data. The device comprises means for interpolating first pixel values for a first sub-unit of reference video to generate first prediction data, wherein interpolating the first pixel values is based on a first set of interpolation filters; means for generating a first syntax element associated with the first sub-unit of reference video to indicate that the first set of interpolation filters are defined in a syntax element associated with a unit of reference video comprising the first sub-unit of reference video; means for encoding the video data based on the first prediction data; means for generating an encoded bit stream that includes the encoded video data and the first syntax element.

In another example, this disclosure describes a device for decoding video data. The device comprises means for receiving in a video bit stream a unit of reference video, wherein the unit of reference video comprises a plurality of sub-units; means for identifying in the unit of reference a video a first syntax element, wherein the first syntax element is associated with a first sub-unit of the plurality of sub-units, and wherein the first syntax element signifies that a first set of interpolation filters are defined in a syntax element associated with the unit of reference video; means for interpolating first pixel values for the first sub-unit of the unit of reference video to generate first prediction data using the first set of interpolation filters; and, means for decoding the video data based at least in part on the first prediction data.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIGS. 4A-4D are conceptual diagrams illustrating integer pixels and interpolated pixels that may comprise pixels of predictive video blocks.

DETAILED DESCRIPTION

This disclosure describes interpolation techniques, which may be performed by an encoder or a decoder during the motion compensation process of video coding. According to the techniques of this disclosure, an encoder may apply a plurality of pre-defined interpolation filters to units of video, such as frames of reference video, in order to generate a plurality of different interpolated prediction data. The encoder may also at times determine that a new interpolation filter or set of interpolation filters could improve coding quality by either improving video compression or improving reconstructed image quality. This disclosure describes techniques for signaling to a video decoder whether one of the pre-defined interpolation filters was used or a new set of interpolation filters was used. This disclosure further describes techniques for signaling to a video decoder whether to continue using the new set of interpolation filters, or whether to revert back to using the pre-defined set of interpolation filters.

Figure 1:
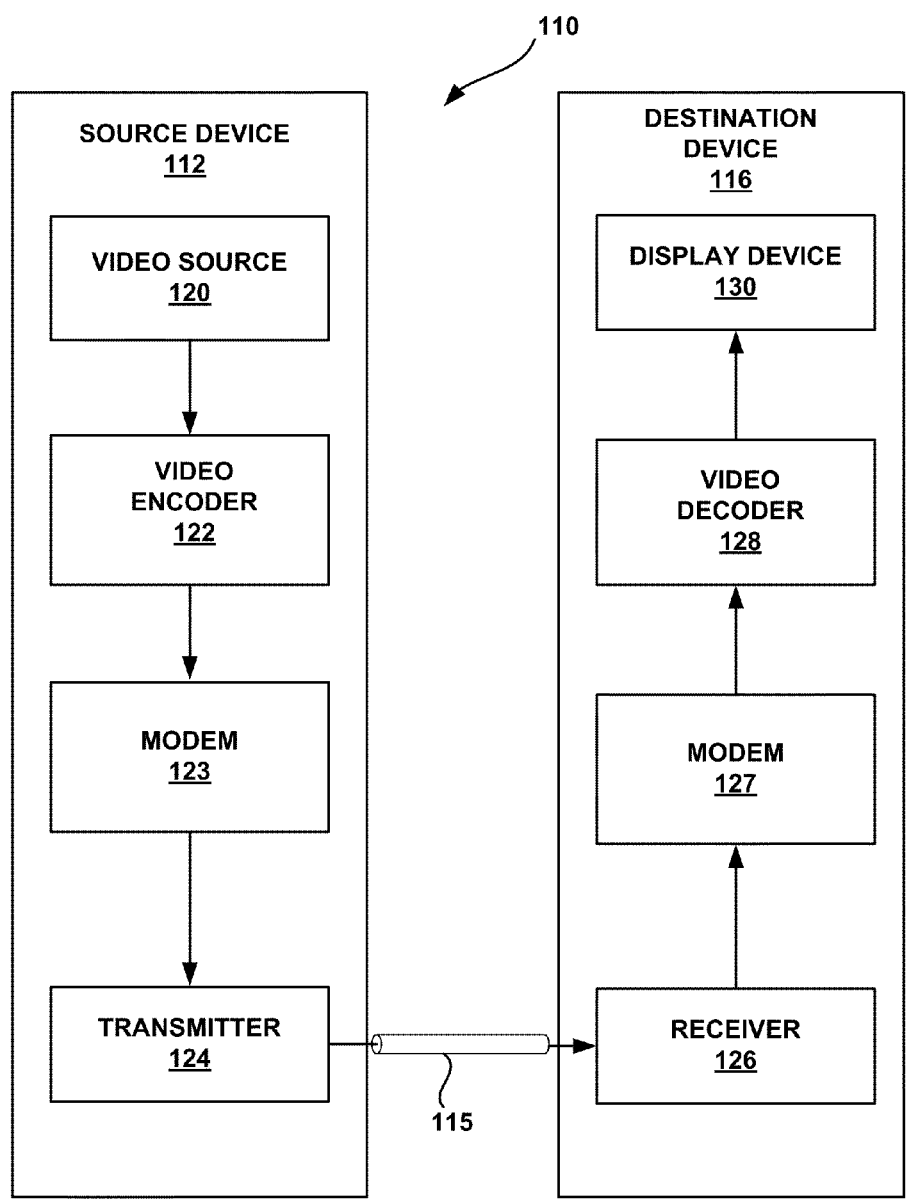
FIG. 1 is an exemplary block diagram illustrating a video encoding and decoding system consistent with this disclosure.

FIG. 1 is a block diagram illustrating one exemplary video encoding and decoding system 110 that may implement techniques of this disclosure. As shown in FIG. 1, system 110 includes a source device 112 that transmits encoded video to a destination device 116 via a communication channel 115. Source device 112 and destination device 116 may comprise any of a wide range of devices. In some cases, source device 112 and destination device 116 comprise wireless communication devices, such as wireless handsets, so-called cellular or satellite radiotelephones, or any wireless devices that can communicate video information over a communication channel 115, in which case communication channel 115 is wireless. The techniques of this disclosure, however, which concern motion compensated interpolation, are not necessarily limited to wireless applications or settings.

In the example of FIG. 1, source device 112 may include a video source 120, video encoder 122, a modulator/demodulator (modem) 123 and a transmitter 124. Destination device 116 may include a receiver 126 a modem 127, a video decoder 128, and a display device 130. In accordance with this disclosure, video encoder 122 of source device 112 may be configured to apply one or more of the interpolation techniques of this disclosure as part of a video encoding process. Similarly, video decoder 128 of destination device 116 may be configured to apply one or more of the interpolation techniques of this disclosure as part of a video decoding process.

The illustrated system 110 of FIG. 1 is merely on example a system in which the techniques of this disclosure may be implemented. The interpolation techniques of this disclosure may be performed by any encoding device that supports motion compensated interpolation to sub-pixel resolution. Source device 112 and destination device 116 are merely examples of such coding devices. In this case, source device 112 generates coded video data for transmission to destination device 116. Devices 112, 116 may operate in a substantially symmetrical manner such that each of devices 112, 116 include video encoding and decoding components, e.g., in a combined encoder-decoder (CODEC). Hence, system 110 may support one-way or two-way video transmission between video devices 112, 116, e.g., for video streaming, video playback, video broadcasting, or video telephony.

Video source 120 of source device 112 may include a video capture device, such as a video camera, a video archive containing previously captured video, or a video feed from a video content provider. As a further alternative, video source 120 may generate computer graphics-based data as the source video, or a combination of live video, archived video, and computer-generated video. In some cases, if video source 120 is a video camera, source device 112 and destination device 116 may form so-called camera phones or video phones. In each case, the captured, pre-captured or computer-generated video may be encoded by video encoder 122. The encoded video information may then be modulated by modem 123 according to a communication standard, e.g., such as code division multiple access (CDMA) or another communication standard, and transmitted to destination device 116 via transmitter 124. Modem 123 may include various mixers, filters, amplifiers or other components designed for signal modulation. For wireless applications, transmitter 124 may include circuits designed for transmitting data, including amplifiers, filters, and one or more antennas.

Receiver 126 of destination device 116 receives information over channel 115, and modem 127 demodulates the information. Again, the video encoding process may implement one or more of the techniques described herein to improve the interpolation during motion compensation. The video decoding process performed by video decoder 128 may also perform interpolation during its motion compensation stage of the decoding process. Display device 130 displays the decoded video data to a user, and may comprise any of a variety of display devices such as a cathode ray tube, a liquid crystal display (LCD), a plasma display, an organic light emitting diode (OLED) display, or another type of display device.

In the example of FIG. 1, communication channel 115 may comprise any wireless or wired communication medium, such as a radio frequency (RF) spectrum or one or more physical transmission lines, or any combination of wireless and wired media. Communication channel 115 may form part of a packet-based network, such as a local area network, a wide-area network, or a global network such as the Internet. Communication channel 115 generally represents any suitable communication medium, or collection of different communication media, for transmitting video data from source device 112 to destination device 116.

Video encoder 122 and video decoder 128 may operate according to a video compression standard, such as the ITU-T H.264 standard, alternatively described as MPEG-4, Part 10, Advanced Video Coding (AVC). The techniques of this disclosure, however, are not limited to any particular coding standard. Although not shown in FIG. 1, in some aspects, video encoder 122 and video decoder 128 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is currently a commonly used video coding standard, and as such, this disclosure uses aspects of the H.264 standard to help explain various concepts using practical, real-world examples. The techniques of this disclosure, however, are in no way limited to the H.264 standard. The Joint Video Team (JVT) and other groups continue to work on both extensions to H.264/MPEG-4 AVC and on new standards altogether, and it is contemplated that the techniques of this disclosure may also be applied to both those H.264 extensions and those next-generation coding standards, including the newly emerging HEVC standard.

Video encoder 122 and video decoder 128 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 122 and video decoder 128 may be included in one or more encoders or decoders, either of which may be integrated as part of a combined CODEC in a respective mobile device, subscriber device, broadcast device, server, or the like.

A video sequence typically includes a series of video frames. Video encoder 122 operates on video blocks within individual video frames in order to encode the video data. The video blocks may have fixed or varying sizes, and may differ in size according to a specified coding standard. Each video frame includes a series of slices. Each slice may include a series of macroblocks, which may be arranged into sub-blocks. As an example, the ITU-T H.264 standard supports intra prediction in various block sizes, such as 16 by 16, 8 by 8, or 4 by 4 for luma components, and 8 by 8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform or a conceptually similar transformation process. New and emerging video standards may support other sized video blocks, including larger blocks such as 32 by 16 blocks, 32 by 32 blocks, 64 by 32 blocks and 64 by 64 blocks.

Smaller video blocks can provide better resolution, and may be used for locations of a video frame that include high levels of detail. In general, macroblocks (MBs) and the various sub-blocks may be considered to be video blocks. In addition, a slice may be considered to be a series of video blocks, such as MBs and/or sub-blocks. Each slice may be an independently decodable unit of a video frame. Video encoder 122 and video decoder 128 perform inter-based predictive coding, which involves the generation of predictive reference data and the subtraction of a video block to be coded from the predictive reference data to generate residual data, which may then be transformed, quantized and entropy coded. The inter-based predictive coding may include interpolation of the predictive data in accordance with this disclosure.

Following inter-based predictive coding (which includes the interpolation techniques of this disclosure), and following any transforms (such as a 4×4 or 8×8 integer transform or a discrete cosine transform DCT), quantization may be performed. Quantization generally refers to a process in which coefficients are quantized to possibly reduce the amount of data used to represent the coefficients. The quantization process may reduce the bit depth associated with some or all of the coefficients. For example, a 16-bit value may be rounded down to a 15-bit value during quantization. Following quantization, entropy coding may be performed, e.g., according to content adaptive variable length coding (CAVLC), context adaptive binary arithmetic coding (CABAC), or another entropy coding methodology.

According to the techniques of this disclosure, video encoder 122 may transmit a video sequence including a series of video frames to video decoder 128. The sequence of video frames can include a sequence header and each frame within the sequence can include a frame header. Video encoder 122 may apply a plurality of pre-defined switched interpolation filters (SIF) to one or more frames of video in the sequence in order to generate a plurality of different interpolated prediction data. The pre-defined switched interpolation filters are defined at both video encoder 122 and video decoder 128, and in this disclosure will be referred to as the fixed-SIF set. According to the techniques of this disclosure, video encoder 122 may also at times determine that a new interpolation filter or set of interpolation filters could improve coding quality compared to the fixed-SIF set by either improving video compression or improving quality of reconstructed images. The new interpolation filters may for example, include analytically derived adaptive filter coefficients or may be a set of interpolation filters known to work well with a particular type of video data, such as low resolution video data down sampled from high resolution video data. For example, if the filter used for downsampling high resolution data is known, it may be possible to determine interpolation filters that result in a low mean squared error between the original high resolution data and high resolution data generated from the lower resolution data. Similarly, the video encoder may use two passes for encoding video data, where during a first pass, the video may be analyzed for scene changes to determine interpolation filters that are optimal for a specific scene.

This disclosure describes techniques for signaling, via interpolation syntax, to video decoder 128 whether video encoder 122 used a filter from the fixed-SIF or a filter from a new set of interpolation filters. As used in this disclosure, interpolation syntax generally refers to any information, in the form of one or more syntax elements, included in the coded bit stream that is used by video decoder 128 to determine which interpolation filter or set of interpolation filters to use in motion compensation. Interpolation syntax is not necessarily limited to discrete pieces of data within a particular portion of the bit stream, but instead may collectively refer to multiple pieces of data located in multiple portions of the coded bit stream. For example, a flag within a sequence header and additional flags within frame headers (or other locations of a bitstream) may collectively be referred to in this disclosure as interpolation syntax. In addition to including data identifying a particular set of interpolation filters, interpolation syntax may include a syntax element that identifies a particular interpolation filter from a set of interpolation filters. For example, if the fixed-SIF set includes four interpolation filters per sub-pixel location, a syntax element in the interpolation syntax may identify which of the four interpolation filters was used for a certain sub-pixel location.

As an example of how the techniques of this disclosure can use interpolation syntax, video encoder 122 may insert a syntax element, such as a flag, into a sequence header to signal to video decoder 128, whether the frames of the sequence were coded using the fixed-SIF set or a new set of interpolation filters. If the flag signals that video encoder 122 used a new set of interpolation filters, then subsequent data in the sequence header can transmit the new set of filters to video decoder 128. If the flag indicates that video encoder 122 used the fixed-SIF set, then subsequent data describing filter coefficients may not need to be included in the sequence header. Each frame may also include a flag in the frame header that signals to video decoder 128, whether video encoder 122 coded the frame using the same set of interpolation filters as in the previous frame, the set of interpolation filters identified in the sequence header, which can be either the fixed-SIF set or a new set, or if video encoder 122 coded the frame using a set of frame-specific interpolation filters. If video encoder 122 coded the frame using a frame-specific interpolation filter, then the coefficients of the frame-specific interpolation filters can be included in the frame header.

Although this disclosure will give examples referring to video sequences and video frames, various types of coding units other than sequences and frames may also be used. For example, techniques described in this disclosure may also be implemented using sequences and groups of frames, or sequences and slices, as opposed to sequences and frames. The techniques described generally include signaling a new set of interpolation filters at a first coding unit level, and then, at a smaller coding unit level (e.g. group of frames, frames, or slices), signaling further information regarding the interpolation filters.

Figure 2:
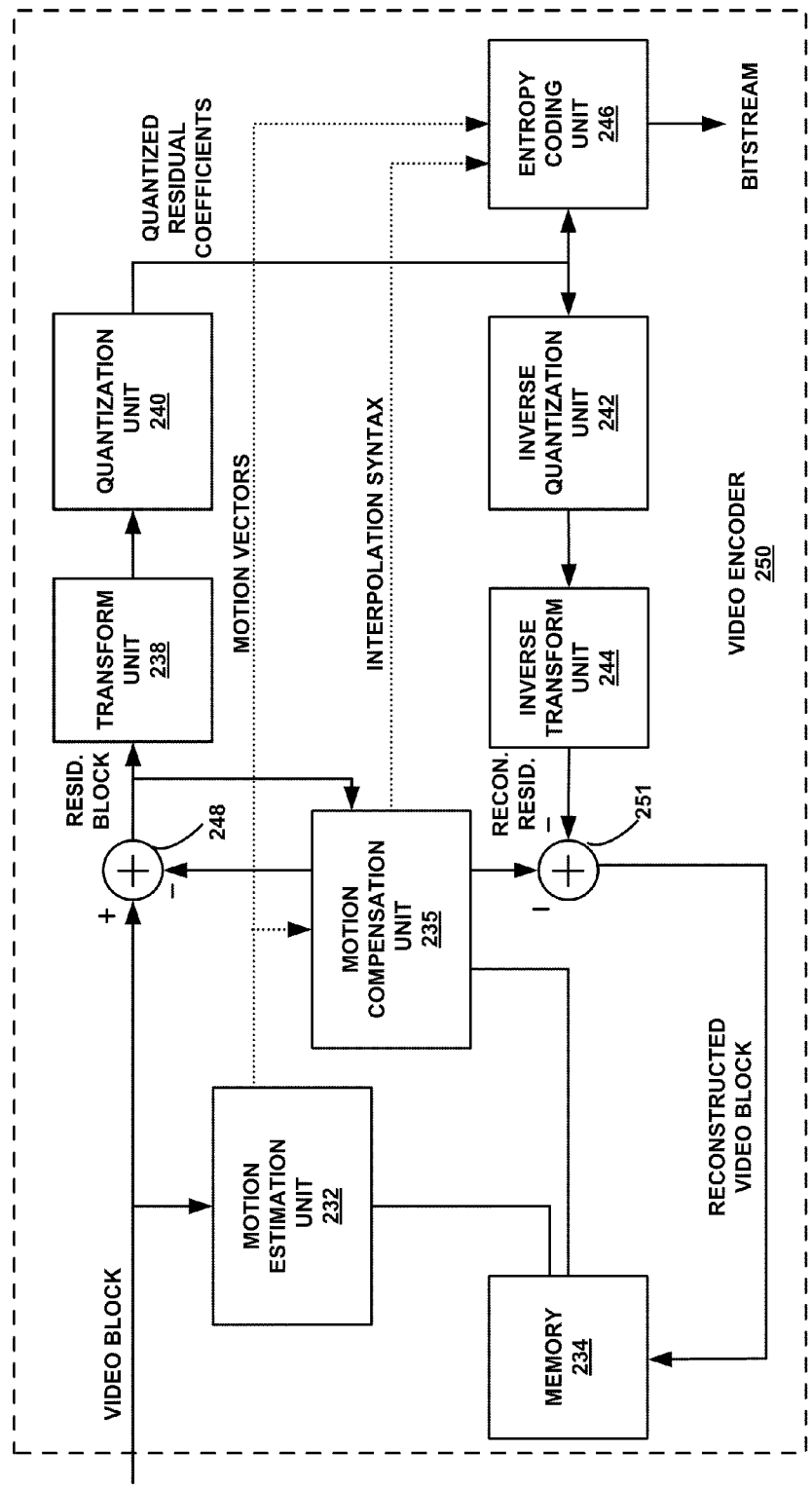
FIG. 2 is a block diagram illustrating an example of a video encoder consistent with this disclosure.

FIG. 2 is a block diagram illustrating an example of a video encoder 250 that may perform motion compensated interpolation consistent with this disclosure. Video encoder 250 may correspond to video encoder 122 of device 112, or a video encoder of a different device. Video encoder 250 may perform intra- and inter-coding of blocks within video frames, although intra-coding is not illustrated. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to the spatial based compression mode and Inter-modes such as prediction (P-mode) or bi-directional (B-mode) may refer to the temporal based compression modes. The techniques of this disclosure typically may be applied during inter-coding, and therefore, intra-coding units such as spatial prediction unit are not illustrated in FIG. 2 for simplicity and ease of illustration.

As shown in FIG. 2, video encoder 250 receives a current video block within a video frame to be encoded. In the example of FIG. 2, video encoder 250 includes motion estimation unit 232, a motion compensation unit 235, a memory 234, an adder 248, a transform unit 238, a quantization unit 240, and an entropy coding unit 246. For video block reconstruction, video encoder 250 also includes an inverse quantization unit 242, an inverse transform unit 244, and an adder 251. A deblocking filter (not shown) may also be included to filter block boundaries to remove blockiness artifacts from reconstructed video. If desired, the deblocking filter would typically filter the output of adder 251. In addition, additional filters (such as post loop or in loop filters) may also be used to improve the video quality.

During the encoding process, video encoder 250 receives a video block to be coded, and motion estimation unit 232 and motion compensation unit 235 perform inter-predictive coding. Motion estimation unit 232 and motion compensation unit 235 may be highly integrated, but are illustrated separately for conceptual purposes. Motion estimation is typically considered the process of generating motion vectors, which estimate motion for video blocks. A motion vector, for example, may indicate the displacement of a predictive block within a predictive frame (or other coded unit) relative to the current block being coded within the current frame (or other coded unit). Motion compensation is typically considered the process of fetching or generating the predictive block based on the motion vector determined by motion estimation. Again, motion estimation unit 232 and motion compensation unit 235 may be functionally integrated. The interpolation techniques described in this disclosure are described as being performed by motion compensation unit 235. However, interpolation may be performed during motion estimation in order to facilitate the selection of the best motion vectors.

In accordance with this disclosure, motion estimation unit 232 selects the appropriate motion vector for the video block to be coded by comparing the video block to video blocks of a predictive coded unit (e.g., a previous frame). At this point, motion compensation unit 235 may perform interpolation in order to generate predictive data at sub-pixel resolution. In some cases, during motion estimation, the interpolation may be based on a fixed interpolation filter. In other cases, the different interpolation filters applied during motion compensation may also be used during the motion estimation process for purposes of motion vector selection.

Once motion estimation unit 232 has selected the motion vector for the video block to be coded, motion compensation unit 235 generates the predictive video block associated with that motion vector. According to this disclosure, however, motion compensation unit 235 may consider several versions of any predictive video block that has sub-pixel resolution. In this case, motion compensation unit 235 may apply a plurality of pre-defined interpolation filters (the fixed-SIF set) in order to generate a plurality of different interpolated prediction data for the video block to be coded. Motion compensation unit 235 may also apply filters other than the fixed-SIF set. As an example, it may be desirable to use a set of new interpolation filters for a particular sequence if a particular low resolution sequence is generated using a specific down sampling filter from a high resolution sequence. In such a case, when motion compensation unit 235 encodes the low resolution sequence, a set of new interpolation filters corresponding to that fractional pixel position can be derived based on the knowledge of the down sampling filter.

Motion compensation unit 235 then selects the interpolated prediction data (e.g., an interpolated video block associated with one of the interpolation filters) that achieves the highest levels of compression. The interpolation filter that was used to generate the interpolated data may be coded as interpolation syntax and communicated to entropy coding unit 246 for inclusion in the coded bitstream. Techniques of this disclosure, which will be discussed in more detail below, include signaling using the interpolation syntax whether motion compensation unit 235 coded the video data using a filter from the fixed-SIF set or a filter from a new set of interpolation filters. Once motion compensation unit 235 has selected and applied the best interpolation filter, the motion compensation unit 235 generates the predictive data using that interpolation filter, and video encoder applies adder 248 to subtract that predictive data from the video block being coded to generate residual data.

As noted, once motion compensation unit 235 generates prediction data (e.g., an interpolated predictive video block), video encoder 250 forms a residual video block by subtracting the prediction data from the original video block being coded. Adder 248 represents the component or components that perform this subtraction operation. Transform unit 238 applies a transform, such as a discrete cosine transform (DCT) or a conceptually similar transform, to the residual block, producing a video block comprising residual transform block coefficients. Transform unit 238, for example, may perform other transforms, such as those defined by the H.264 or HEVC standards, which are conceptually similar to DCT. Wavelet transforms, integer transforms, sub-band transforms or other types of transforms could also be used. In any case, transform unit 238 applies the transform to the residual block, producing a block of residual transform coefficients. The transform may convert the residual information from a pixel domain to a frequency domain.

Quantization unit 240 quantizes the residual transform coefficients to further reduce bit rate. The quantization process may reduce the bit depth associated with some or all of the coefficients. For example, a 16-bit value may be rounded down to a 15-bit value during quantization. Following quantization, entropy coding unit 246 entropy codes the quantized transform coefficients. For example, entropy coding unit 246 may perform content adaptive variable length coding (CAVLC), context adaptive binary arithmetic coding (CABAC), or another entropy coding methodology. Following the entropy coding by entropy coding unit 246, the encoded video may be transmitted to another device or archived for later transmission or retrieval. The coded bitstream may include entropy coded residual blocks, motion vectors for such blocks, and other syntax including the interpolation syntax that identifies the interpolation filters that were applied by motion compensation unit 235.

Inverse quantization unit 242 and inverse transform unit 244 apply inverse quantization and inverse transformation, respectively, to reconstruct the residual block in the pixel domain, e.g., for later use a reference block. Adder 251 adds the reconstructed residual block to the motion compensated prediction block produced by motion compensation unit 235 to produce a reconstructed video block for storage in memory 234. The reconstructed video block may be used by motion estimation unit 232 and motion compensation unit 235 as a reference block to inter-encode a block in a subsequent video frame.

Figure 3:
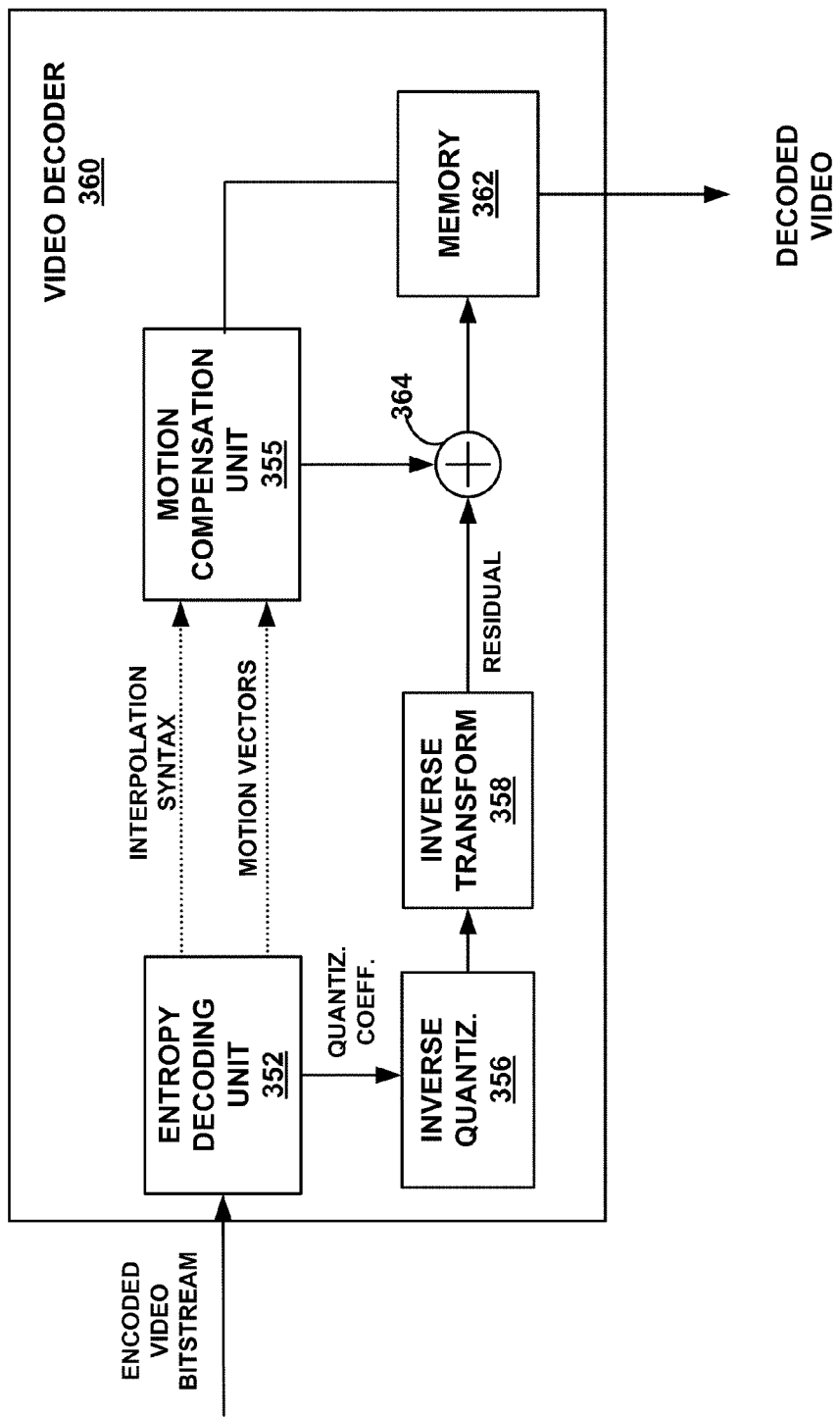
FIG. 3 is a block diagram illustrating an example of a video decoder consistent with this disclosure.

FIG. 3 is a block diagram illustrating an example of a video decoder 360, which decodes a video sequence that is encoded in the manner described herein. Video decoder 360 includes a motion compensation unit 355 that performs the interpolation techniques of this disclosure for decoding. In particular, on the decoding side, motion compensation unit 355 may receive, from the interpolation syntax, a syntax element from entropy decoding unit 352 that identifies whether or not frames of the video sequence were coded using a filter from the fixed-SIF set or a filter from a new set of interpolation filters. If a new filter set was used, then the sequence header may also include additional data defining the new set of interpolation filters. Motion compensation unit 355 may generate prediction data, which includes interpolating pixel values of reference video data based on the set of interpolation filters identified by the interpolation syntax. Specifically, motion compensation unit 355 may generate the prediction data based on motion vectors received from entropy decoding unit 352 and the interpolations as defined by a syntax element (labeled interpolation syntax in FIG. 3). Based on this interpolated prediction data, the video data (e.g., a reconstructed residual video block) can be decoded.

Entropy decoding unit 352 entropy decodes the received bitstream to generate quantized coefficients and the syntax (e.g., interpolation syntax and motion vectors sent to motion compensation unit 355). Inverse quantization unit 356 inverse quantizes, i.e., de-quantizes, the quantized block coefficients. The inverse quantization process may be a conventional process as defined by H.264 decoding. Inverse transform unit 358 applies an inverse transform, e.g., an inverse DCT or conceptually similar inverse transform process, to the transform coefficients in order to produce residual blocks in the pixel domain. Motion compensation unit 355 produces motion compensated blocks in the manner described herein, e.g., including interpolation based on a set of interpolation filter coefficients identified by the syntax element (i.e., the interpolation syntax).

Adder 364 decodes residual blocks by summing the residual blocks with the corresponding prediction blocks generated by motion compensation unit 355 to form decoded blocks. If desired, a deblocking filter may also be applied to filter the decoded blocks in order to remove blockiness artifacts. The decoded video blocks are then stored in memory 362, which is a storage element that provides reference blocks for subsequent motion compensation and also produces decoded video to a drive display device (such as device 130 of FIG. 1).

Again, the techniques of this disclosure concern motion compensated interpolation in which pixel values of predictive video blocks are interpolated to sub-pixel resolution. The encoder uses the techniques of this disclosure to identify whether a sequence of video frames were encoded using a filter from the fixed-SIF set or a new set of interpolation filters. The different filters, whether part of the fixed-SIF set or a new set, may be characterized by different sets of filter coefficients, different numbers of filter coefficients, or different filter types. The decoder interprets syntax elements sent from the encoder in order to identify the same desirable set of interpolation filter coefficients used by the encoder.

FIGS. 4A-4D are conceptual diagrams illustrating integer pixels and interpolated pixels that may comprise pixels of predictive video blocks. In the conceptual illustration of FIG. 4, the different boxes represent pixels. Capitalized letters (in the boxes with solid lines) represent integer pixel locations, while small letters (in the boxes with dotted lines) represent the interpolated pixel locations. The lettered labels may be used herein to describe the pixel locations, or pixel positions, or may refer to the pixel values associated with the various locations. Pixel locations "aa," "bb," "cc," "dd," "ee," "ff," "gg," "hh," "ii," and "jj," are half-pixel locations used in the fractional interpolations of various fractional locations associated with pixel location "C3."

Every pixel location may have an associated 15 different fractional locations, e.g., in compliance with interpolations compliant with the ITU H.264/AVC standard, or may have an associated 63 fractional locations in compliance with the newly emerging HEVC standard. In the example of FIGS. 4A-4D, these 15 different fractional locations associated with pixel "C3" are illustrated, as sub-pixel locations a through o. For simplicity and ease of illustration, most of the other fractional locations are not shown (other than those mentioned above, which are used to generate one or more of the 15 different fractional locations associated with pixel "C3"). While, for ease of explanation, the examples of FIGS. 4A-4D show only 15 different fractional locations, the techniques of this disclosure could be easily extended to 63 different fractional locations or other fractional pixel accuracy.

In the ITU H.264/AVC standard, in order to obtain luma signals at half-pixel positions, a 6-tap Wiener filter with coefficients [1, −5, 20, 20, −5, 1] is typically used. Then, in order to obtain luma signals at quarter-pixel locations, a bilinear filter is used. The bilinear filter may also be used in fractional pixel interpolation for the chroma components, which may have up to ⅛-pixel precision in H.264/AVC.

Figure 4A:
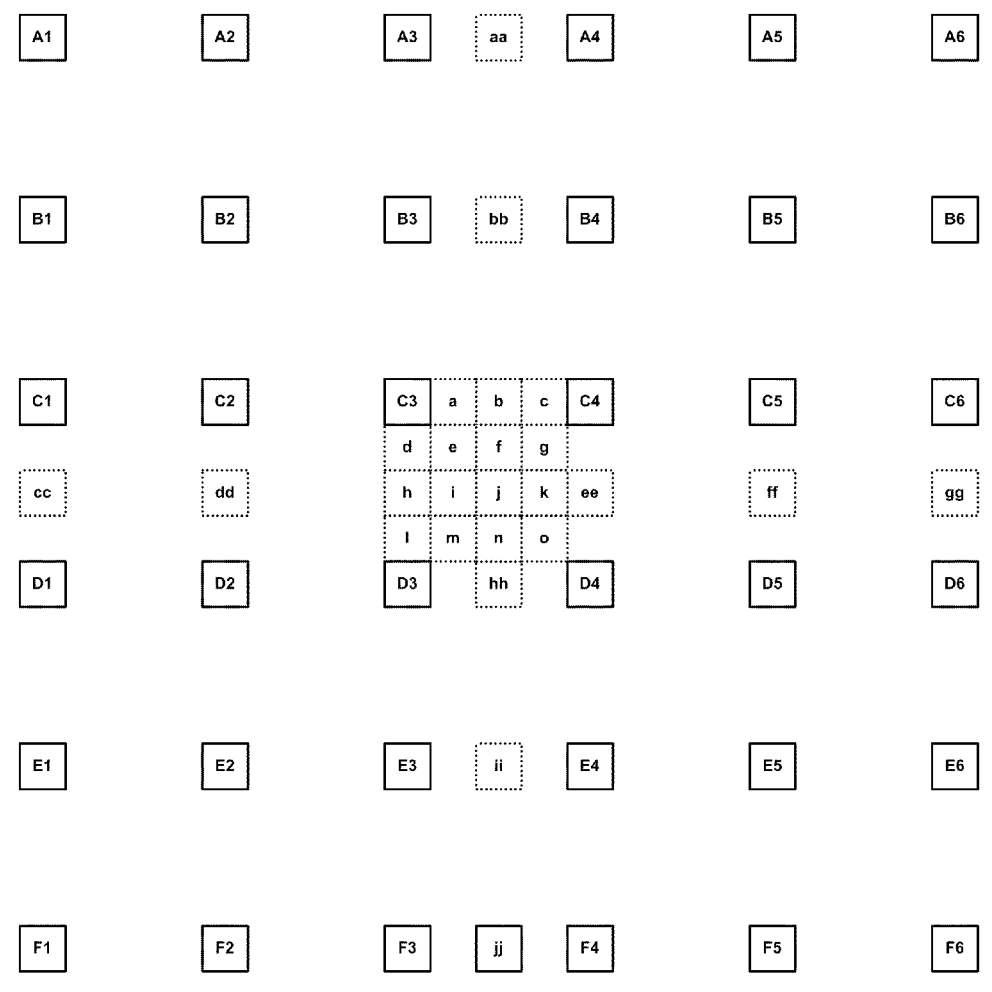
Figure 4B:
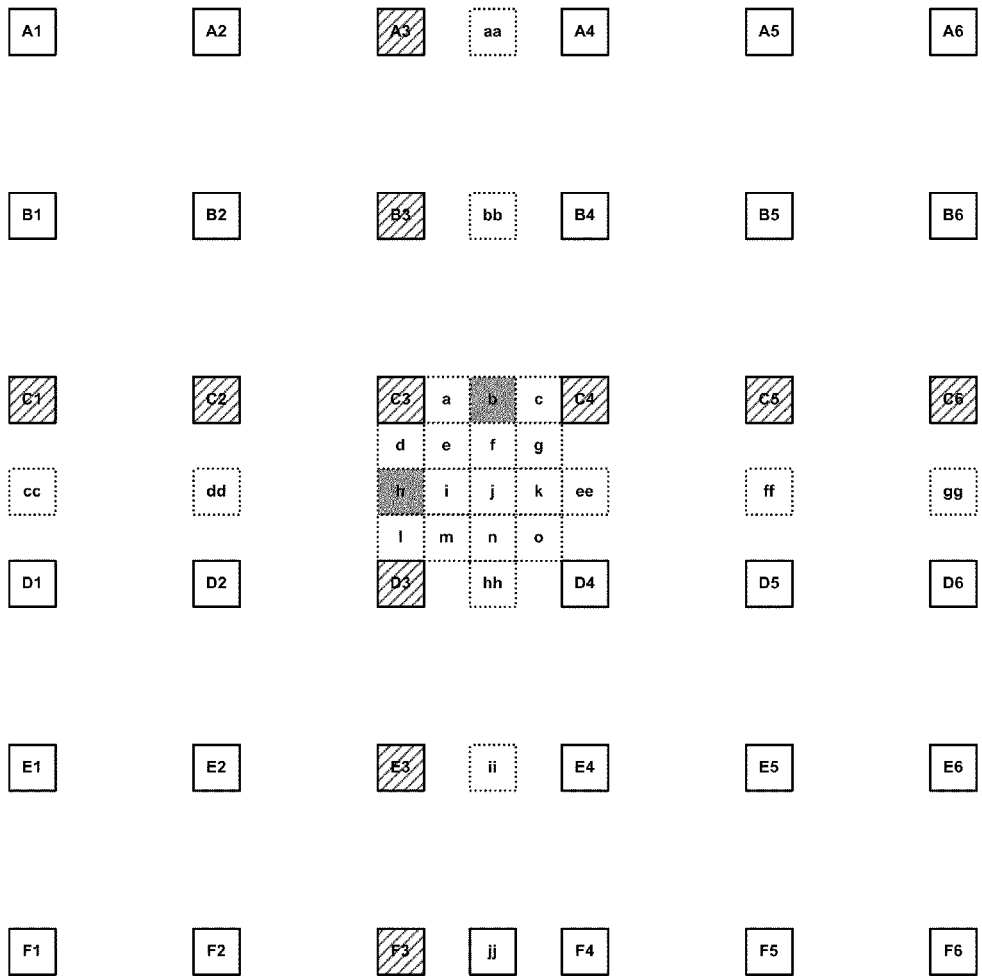

Half-pixel interpolations of pixel locations "b" and "h" are demonstrated in FIG. 4B in the horizontal and vertical directions respectively. In this case, pixel location "b" may be interpolated based on integer pixels "C1," "C2," C3," "C4," "C5," and "C6." Similarly, pixel location "h" may be interpolated based on integer pixels "A3," "B3," C3," "D3," "E3," and "F3." Different interpolation filters (e.g., different sets of filter taps) may be applied to generate different interpolated values of pixel locations "b" and "h" as described herein. In FIG. 4B, interpolated pixel locations "b" and "h" are shown with shading, and integer pixel locations "C1," "C2," C3," "C4," "C5," "C6," "A3", "B3", "C3", "D3", "E3" and "F3" are shown with cross-hashes.

Figure 4C:
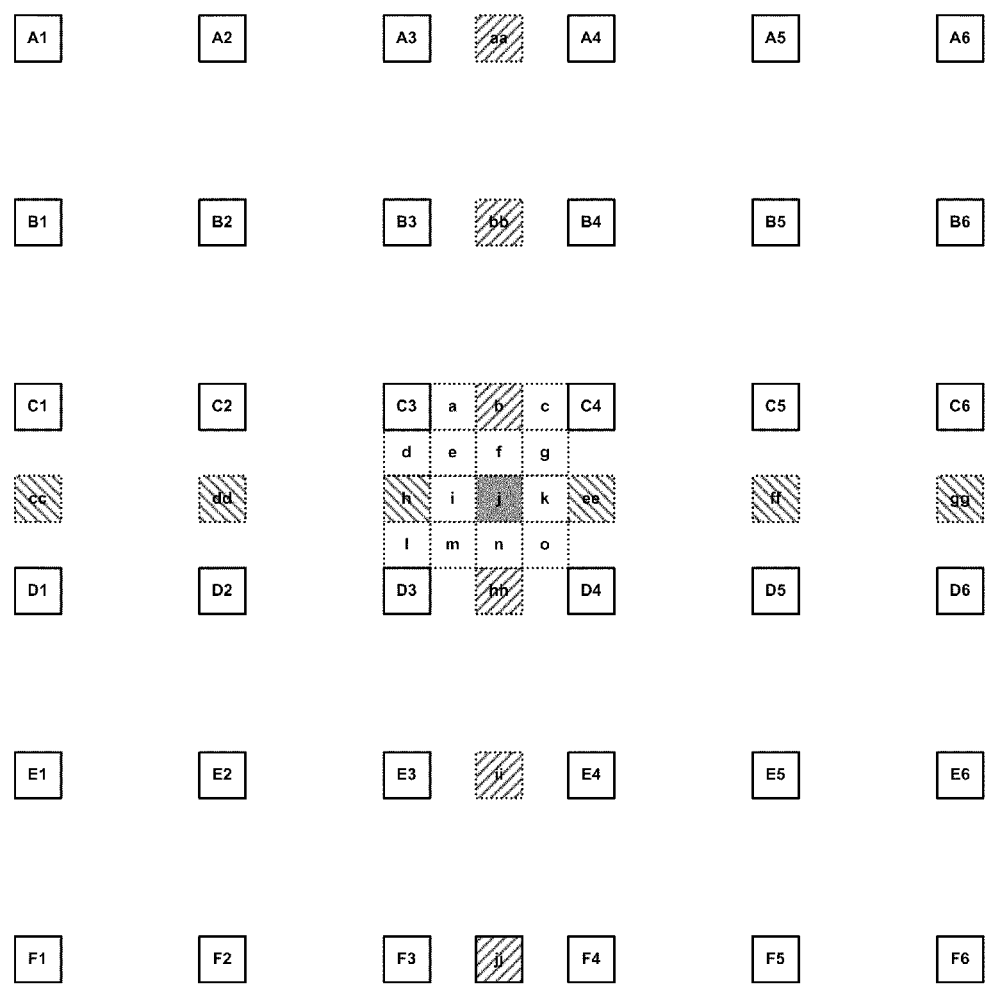

FIG. 4C illustrates one special case that may require two levels of interpolation. In particular, pixel location "j" is unlike the other half-pixel locations insofar as pixel location "j" is itself interpolated based on other half-pixel values. For example, pixel location "j" may be interpolated based on half-pixel interpolated values "cc," "dd," "h," ee," "ff," and "gg" in the horizontal direction. Alternatively, pixel location "j" may be interpolated based on half-pixel interpolated values "aa," "bb," "b," hh," "ii," and "jj" in the vertical direction. In FIG. 4C, interpolated pixel location "j" is shown with shading, half-pixel interpolated values "aa," "bb," "b," hh," "ii," and "jj" in the vertical direction are shown with right-to-left cross-hashes, and half-pixel interpolated values "cc," "dd," "h," ee," "ff," and "gg" are shown with left-to-right cross-hashes.

Figure 4D:
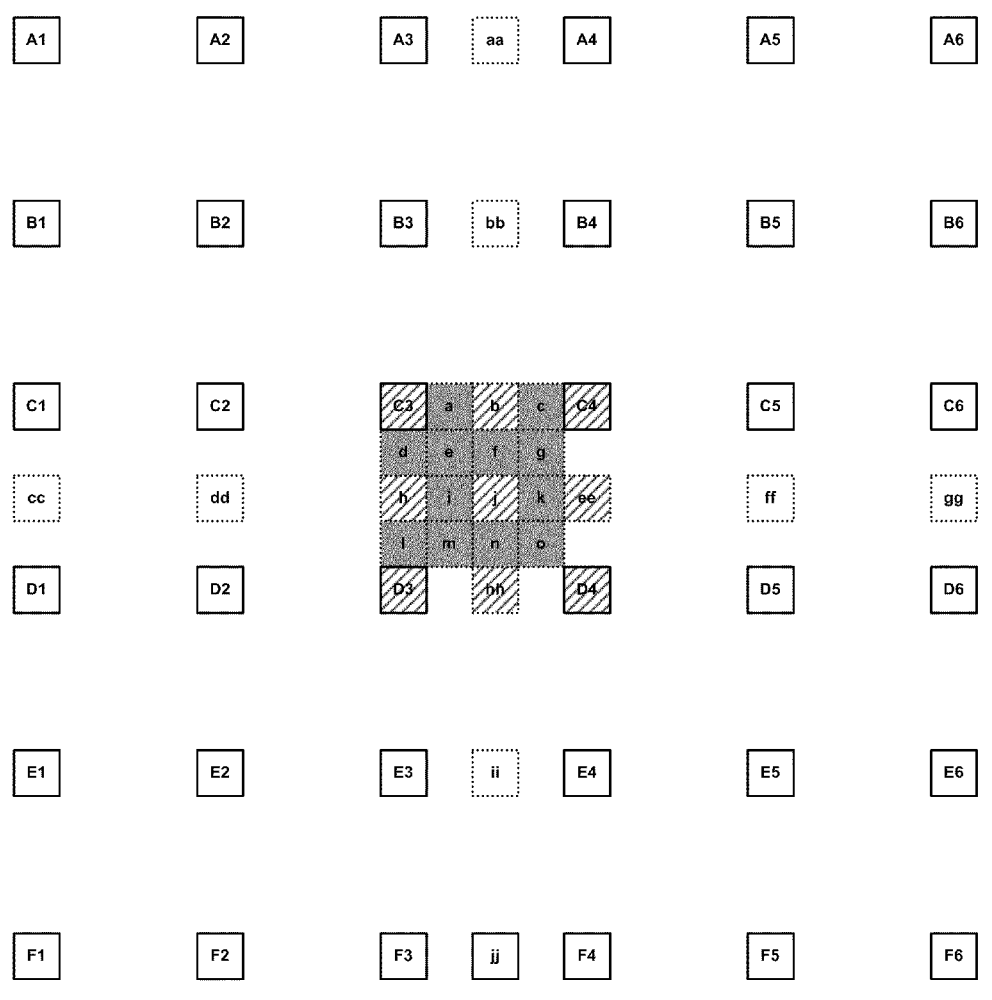

FIG. 4D illustrates quarter-pixel locations "a," "c," "d," "e," f," "g," "i," "k," "l," m," "n," and "o" with shading, and illustrates the integer and half-pixel locations used for such quarter-pixel interpolation (e.g., "C3," "b," "C4," "h," j," "ee," "D3," "hh," and "D4") with cross-hashes. In some coding standards, all fractional positions, including both quarter-pixel locations and one-eighth-pixel locations, may be interpolated using direct filtering as opposed to multi-step interpolation filtering. According to the techniques of this disclosure, each fractional pixel position can have an associated set of interpolation filters (i.e. the fixed-SIF set) from which a specific filter can be chosen, or may have associated set of additional interpolation filters.

After motion estimation, the best motion vector for a given video block may be identified, e.g., possibly using a rate-distortion model to balance the coding rate and quality. Then, the prediction video block is formed during motion compensation using the best motion vector. As outlined above, the residual video block is formed by subtracting the prediction video block from the original video block. A transform is then applied on the residual block, and the transform coefficients are quantized and entropy coded to further reduce bit rate.

Again, FIGS. 4A-4D show the integer-pixel samples (also called full-pixels) in the solid boxes with upper-case letters. For any given integer-pixel sample, there are altogether 15 sub-pixel positions, which are shown for integer-pixel sample "C3" and labeled "a" through "o" in FIGS. 4A-4D. In H.264/AVC, the half-pixel positions "b," "h," and "j" may be calculated first using the one-dimensional 6-tap Wiener filter. As noted, half-pixel position "j" may require two levels of this interpolation using 6-tap filtering. In this case, for pixel position "j," the interpolation filter is applied first in the horizontal direction and then in the vertical direction, possibly with intermediate rounding of interpolated pixel values after interpolation in one dimension in order to ensure that data can be stored within sixteen-bit storage elements. Remaining quarter-pixel positions are then interpolated via filtering that uses a bilinear filter and the already calculated half-pixel samples.

Figure 5:
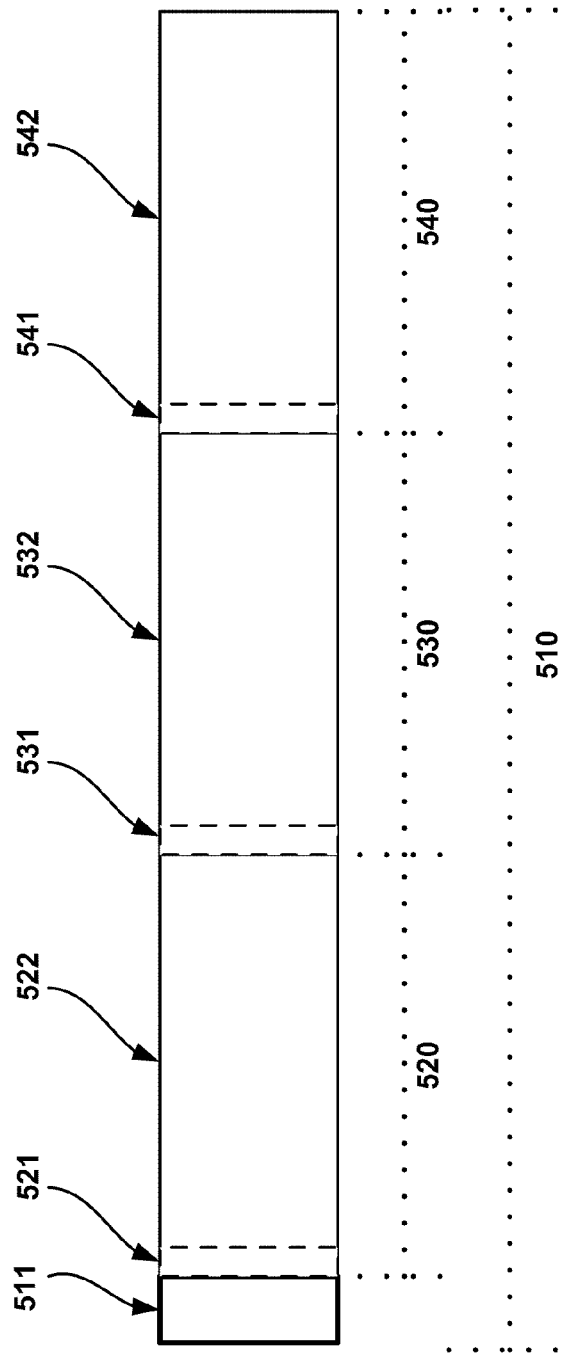
FIG. 5 is a conceptual illustration of a unit of data consistent with this disclosure.

FIG. 5 represents a coded unit of reference video 510, such as a sequence of video frames or a group of pictures. The coded unit includes a unit header 511, such as a sequence header, and a plurality of sub-units 520, 530, 540, such as a plurality of frames. Each sub-unit 520, 530, 540 includes a sub-unit header 521, 531, 541, such as a frame header, and payload data 522, 532, 542. Payload data generally can include any type of data, such as encoded residual video data. As introduced above, techniques of the present disclosure include a video encoder, such as video encoder 122 or 250, sending interpolation syntax in a coded bit stream to a video decoder, such as video decoder 128 or 360. The interpolation syntax can include a plurality of syntax elements dispersed throughout the unit header 511 and sub-unit headers 521, 531, 541 of a unit of reference video 510.

The interpolation syntax includes a plurality of syntax elements that enable the video decoder to determine the interpolation filter or set of interpolation filters used by the video encoder during motion compensation. In one example, a video encoder includes a flag in unit header 511 that indicates whether sub-units 520, 530 540 were coded using the fixed-SIF set or new interpolation filters. The flag may, for example, be a single bit where a 0 signifies the video encoder used the fixed-SIF set, and a 1 signifies that new interpolation filters were used. If the flag is set to 0 and the fixed-SIF set was used, then video encoder may not transmit to the video decoder any additional information regarding new filters. If, however, the flag is set to 1 and new interpolation filters were used by the video encoder, then the video encoder may transmit additional information in unit header 511 to the video decoder that allows the video decoder to reconstruct the set of new interpolation filters used by the video encoder. As described above, various techniques exist that allow a video decoder to reconstruct a full set of interpolation filters while receiving fewer than all the filter coefficients for the various interpolation filters in the set.

When the flag is set to 1 indicating that new interpolation filters were used, it does not necessarily indicate that a new interpolation filter or set of interpolation filters was used for ever sub-pixel location. In some implementations, a video encoder can use new interpolation filters in addition to the fixed-SIF set, in essence expanding the fixed-SIF set. For example, if the fixed-SIF set includes four interpolation filters per sub-pixel location and the flag is set to 1 indicating new interpolation filters were used, then the video encoder may transmit to the video decoder two new interpolation filters for each sub-pixel location. When performing motion compensation, the video encoder and decoder are not necessarily limited to the two new interpolation filters for each sub-pixel location, but instead may choose from six interpolation filters for the sub-pixel position, where the set of six interpolation filters includes the four filters from the fixed-SIF set and the two new interpolation filters.

In examples where a single new interpolation filter is used for each fractional pixel position, then for each fractional pixel position, the video encoder can transmit the filter coefficients to the video decoder in unit header 511. In some implementations, the number of filter coefficients used in the new interpolation filters may be variable, in which case the video encoder might transmit to the video decoder a syntax element in unit header 511 indicating the number of filter coefficients in addition to the coefficients themselves. In implementations where the number of coefficients for each interpolation filter for each fractional pixel position is the same, then only a single syntax element indicating the number of filter coefficients needs to be transmitted from the video encoder to the video decoder in unit header 511. In implementations where each sub-pixel location potentially uses a different number of filter coefficients, then the video encoder may include in the unit header a syntax element indicating the number of filter coefficients. In implementations where different groups of sub-pixel locations, such as half pixel positions and quarter pixel positions, each have a different number of possible filter coefficients, then a syntax element indicating the number of filter coefficients can be for each group can be included in unit header 511.

The video encoder and video decoder can be configured to take advantage of various symmetries in filter coefficients to limit the number of filter coefficients, and hence the number of bits, that need to be transmitted. The remaining coefficients can be generated at the decoder based on the communicated coefficients. In particular, the decoder can be programmed to know that symmetry applies, and the symmetry can define how to generate any remaining coefficients based on the communicated coefficients. For example, if the video encoder signals to the video decoder, that the new interpolation filter for each fractional position includes six coefficients, then the video encoder may only transmit three coefficients to the video decoder for half-pixel positions "b," "h," and "j," and from those three coefficients, the video decoder can reconstruct the six coefficients for the interpolation filter. If, for sub-pixel location "b" for example, the video encoder transmits coefficients X1, X2, and X3, then the video decoder can use symmetry to reconstruct the six coefficients of the interpolation filter, which would correspond to [X1*C1+X2*C2+X3*C3+X3*C4+X2*C5+X1*C6]. For some sub-pixel locations, the video decoder may be able to reuse the coefficients for the interpolation filter at a first sub-pixel location to reconstruct an interpolation filter at a different sub-pixel location. For example, if the filter coefficients for sub-pixel position "a" are X1, X2, X3, X4, X5, and X6, then from those six coefficients, video decoder can reconstruct two interpolation filters. The interpolation filter for sub-pixel "a" may be [X1*C1+X2*C2+X3*C3+X4*C4+X5*C5+X6*C6] while the interpolation filter for sub-pixel "c" may be [X6*C1+ X5*C2+X4*C3+X3*C4+X2*C5+X1*C6].

In examples where a set of new filters, as opposed to a single new filter, are used for each fractional pixel position, then for each fractional pixel position, the video encoder may transmit the coefficients for the set of new interpolation filters to the video decoder. In some implementations, one or both of the number of new possible filters and the number of coefficients in each filter can vary, in which case the video encoder transmits to the video decoder a syntax element indicating the number of new interpolation filters per fractional position and/or a syntax element indicating the number of filter coefficients per new interpolation filter. If the number of possible new interpolation filters is the same for all fractional pixel positions, then a single syntax element indicating the number of possible new interpolation filters can be transmitted from the video encoder to the video decoder. If, however, each fractional position can have a different possible number of new interpolation filters, then for each fractional pixel position, a syntax element indicating the number of new possible interpolation filters can be sent from the video encoder to the video decoder.

In some implementations, a set of new interpolation filters might include a first number of new interpolation filters for some fractional pixel positions and a different number of new interpolation filters for other fractional positions. For example, a new set of interpolation filters may include two new interpolation filters for each of half-pixel locations b, h, and j and four new interpolations for each of quarter-pixel locations a, c, d, e, f, g, i, k, m, and o. In such an example, video encoder might transmit to video decoder two syntax elements indicating the number of possible new interpolation filters, the first syntax element indicating the number of new possible interpolation filters for the half-pixel locations and the second syntax element indicating the number of possible new interpolation filters for the quarter-pixel locations.

As discussed above, in some implementations, the number of filter coefficients used in the new interpolation filters may also be variable, in which case the video encoder may transmit to the video decoder a syntax element indicating the number of filter coefficients for the filters at each sub-pixel location. In implementations where each filter for each fractional pixel position uses the same number of filter coefficients, then the video encoder may only transmit to the video decoder a single syntax element indicating the number of filter coefficients. In implementations where each sub-pixel location potentially uses a different number of filter coefficients, then a syntax element indicating the number of filter coefficients is sent from the video encoder to the video decoder for each sub-pixel position. In implementations where different groups of sub-pixel locations, such as half pixel positions and quarter pixel positions, each have a different number of possible filter coefficients, then a syntax element indicating the number of filter coefficients can be sent from the video encoder to the video decoder for each group. As discussed in more detail above, the number of bits needed to transmit the filter coefficients from the video encoder to the video decoder can be reduced by using symmetry at the video decoder when reconstructing the filter coefficients.

Assuming the number of fixed filters in the fixed-SIF set is represented by the variable "NumFixedFilters," then a one bit flag in the sequence header may be used to indicate whether additional filters are being included in the bit-stream. If the flag is 1, the number of extra filters can also be signaled, followed by the precision of filter coefficients in bytes and the coefficients of each filter. If filters for $\frac{1}{4}^{th}$, $\frac{1}{2}$, and $\frac{3}{4}^{th}$ pixel positions are being sent, then due to various symmetries discussed previously, it is sufficient to send (3*number of taps/2) coefficients to specify filters to be used in all fractional pixel ($\frac{1}{4}^{th}$) positions. Thus, if the flag is 1, the number of extra filters (NumExtraFilters) is signaled. In one example, the maximum number of additional filters might be restricted to 4. In such a case, the number of extra filters can be signaled using 2 bits (NumExtraFilters−1). Those skilled in the art will recognize that it is possible to use a different maximum. For each filter, the filter precision can be signaled as a number of bytes. Thus if the filter coefficient are in the range [−128, 127], only one byte is necessary. In one example, a maximum of 2 bytes might be allowed for filter precision. Thus it can be signaled using a single bit, where 0 corresponds to 1 byte and 1 corresponds to 2 bytes). This can be followed by sending ((number of taps/2)−1). It should be noted that the interpolation filters used are generally always even length. Then, (3*number of taps/2) coefficients are sent using the precision specified previously. This is repeated for each additional filter. This example assumes that one additional filter refers to one additional filter for all fractional pixel ($\frac{1}{4}^{th}$) positions.

So in total, after receiving the additional interpolation filters, there are now a total of N filters, where N=NumFixedFilters+NumExtraFilters. If no extra filters are included, NumExtraFilters=0.

The preceding discussion has focused on syntax elements included in the header of a first coding unit, such as a video sequence header. Additional syntax elements can be included in headers for sub-units of that coding unit, such as in the frame headers for frames of a video sequence. In some cases, each frame header may include syntax elements indicating whether the frame was coded using the same set of interpolation filters as used in the previous frame, the set of interpolation filters identified in the sequence header, which may be either the fixed-SIF set or new interpolation filters included in the sequence header, or if another new set of interpolation filters is included in the frame header.

In one example, a syntax element of a single bit can be used to signal to the video decoder whether a particular frame of a sequence was coded using same set of interpolation filters as the previous frame (in the encoding order) in the sequence. For example, if the same set of interpolation filters was used, the single bit might be set to 0, and if a different set of interpolation filters was used, the bit may be set to 1. If the bit is set to 1 indicating a different set of interpolation filters was used, then a second bit can be used to indicate whether the different set of interpolation filters are the interpolation filters identified in the sequence header or if the different set of interpolation filters are included in the frame header. Therefore, for each frame, the syntax element in the frame header can be interpreted as follows:

0: The same set of interpolation filters as in the previous frame (in the encoding order) is used.

10: The set of interpolation filters from the sequence header is used. This set can be the fixed-SIF set or a new set of interpolation filters identified in the sequence header, as described above.

11: A new set of interpolation filters is included in the frame header.

When the syntax element in the frame header equals 11, then an additional filter or filter set for each sub-pixel location can be included in the frame header using the same techniques described above for including additional interpolation filters in the sequence header.

Figure 6:
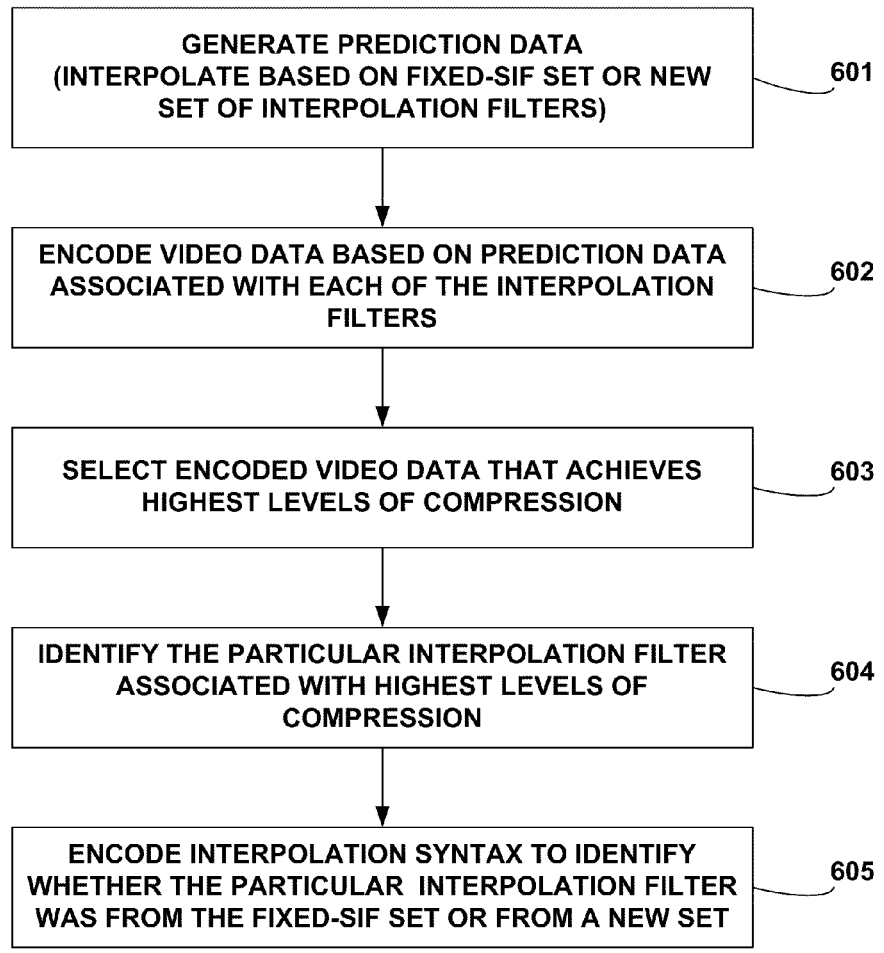
FIGS. 6-9 are flow diagrams illustrating techniques consistent with this disclosure.

FIG. 6 is a flow diagram consistent with one or more aspects of video encoding consistent with this disclosure. FIG. 5 will be discussed from the perspective of video encoder 250 shown in FIG. 2. In particular, motion compensation unit 235 generates prediction data (601), which includes interpolating based on interpolation filters that are either part of a fixed-SIF set or a set of new interpolation filters. Motion compensation unit 235 then encodes video data, e.g., a video block, based on the prediction data associated with each of the interpolation filters (602). For example, motion compensation unit 235 may invoke adder 248 to generate residual blocks associated with each of the interpolation filters so that the different residual blocks can be compared to one another to find the best residual block. Motion compensation unit 235 selects the video data that achieves the highest levels of compression (603). In particular, the selected video data is illustrated as the "resid. block" output of adder 248, which is the final output. This final output of adder 248 is transformed by transform unit 238, quantized by quantization unit 240, and entropy coded by entropy coding unit 246.

Motion compensation unit 235 also identifies the particular interpolation filter that was associated with the selected residual video data that achieved the highest levels of compression (604). Motion compensation unit 235 forwards an interpolation syntax element to entropy coding unit 246. The interpolation syntax identifies whether the particular interpolation filter that was used was from the fixed-SIF set or was from a new set of interpolation filters. If the particular interpolation filter used was from the fixed-SIF set, then motion compensation unit 235 identifies which filter of the fixed-SIF set corresponds to the particular interpolation filter, and if the particular interpolation filter used was from a new set of interpolation filters, then motion compensation unit 235 transmits data so that the new set of interpolation filters can be reconstructed at a decoder. In the example of FIG. 2, entropy coding unit 246 encodes the interpolation syntax (605) to form part of the output bitstream. In other examples, however, syntax elements, such as the 0, 10, and 11 syntax elements described above, may be encoded to form part of the output bitstream without undergoing an entropy coding process. By encoding the interpolation syntax elements in the output bitstream, the interpolation filter used at video encoder 250 (e.g., the filter coefficients used, or other filter designs or parameters) can be communicated to a destination device so that the destination device can perform the proper interpolation filtering during video reconstruction.

Figure 7:
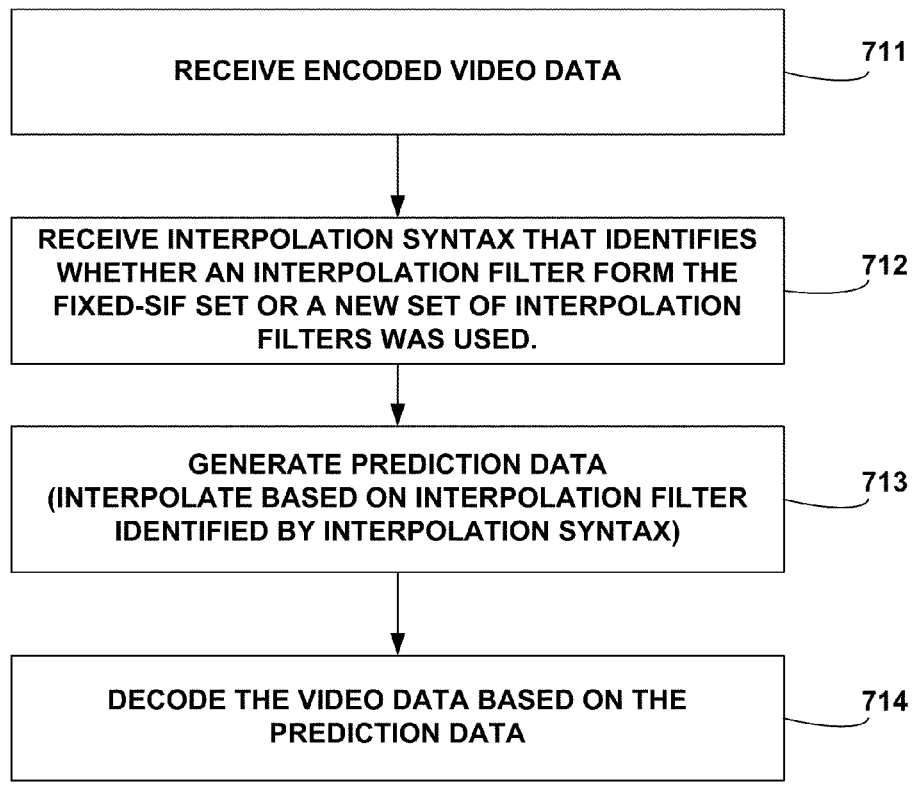

FIG. 7 is a flow diagram consistent with one or more aspects of video decoding consistent with this disclosure. FIG. 7 will be discussed from the perspective of video decoder 360 shown in FIG. 3. In particular, video decoder 360 receives an encoded video data (711), and receives interpolation syntax that identifies whether the encoded video data was encoded using filters from the fixed-SIF set or new interpolation filters (712). The encoded bitstream may include both the encoded residual video data and the interpolation syntax element that identifies the interpolation filter that was used at the encoder. In the example, entropy decoding unit 352 entropy decodes the received bitstream to parse out the transformed and quantized residual blocks, which are sent to inverse transform quantization unit 356 and inverse transform unit 358, and to parse out the interpolation syntax element and motion vectors, which are sent to motion compensation unit 355. In other examples, however, the interpolation syntax may not need to be entropy decoded.

Motion compensation unit 355 generates prediction data (713), which includes interpolations based on the interpolation filter identified by the interpolation syntax element. Video decoder 360 decodes the video data based on the prediction data (714). In particular, the prediction data generated by motion compensation unit 355 may be combined with residual data via adder 364 to reconstruct the video data in the pixel domain. Decoded video may then be stored in memory 362 for subsequent use in prediction, and may also be output for presentation to the user, e.g., via a display or other output device.

Figure 8:
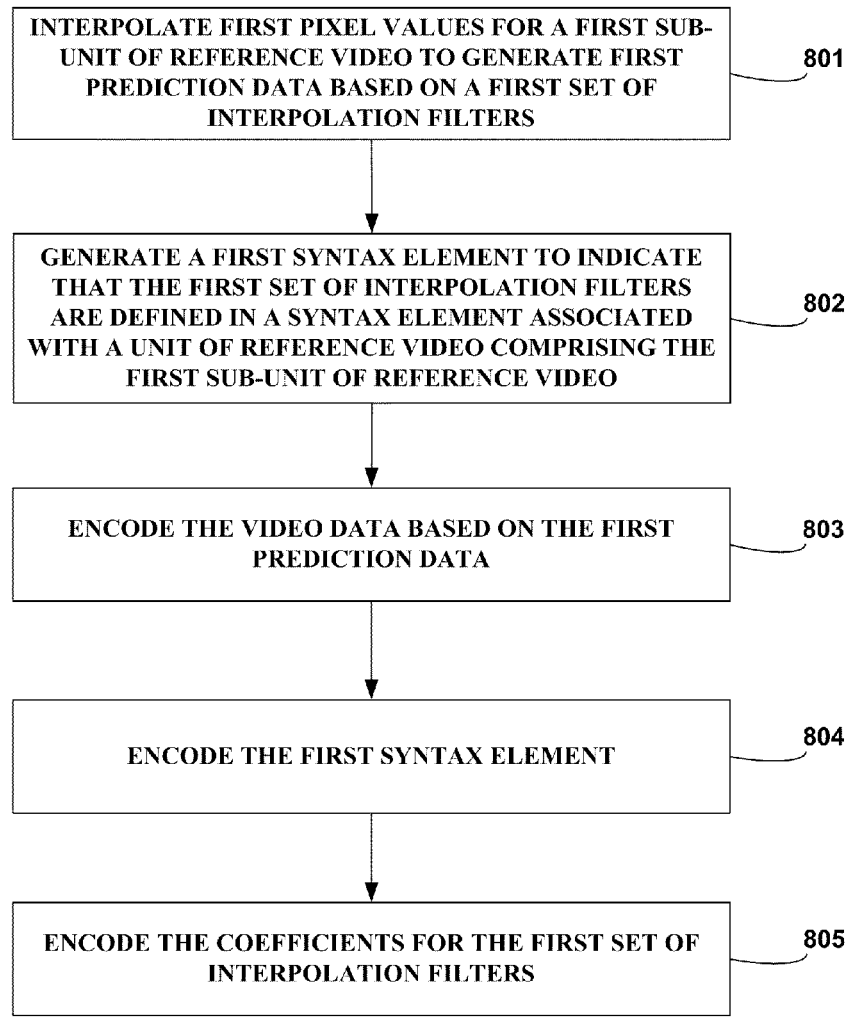

FIG. 8 is a flow diagram illustrating one or more aspects of video encoding consistent with this disclosure. FIG. 8 will be discussed from the perspective of video encoder 250 shown in FIG. 2. Motion compensation unit 235 interpolates first pixel values for a first sub-unit of reference video to generate first prediction data based on a first set of interpolation filters (801). Motion compensation unit 235, may for example, interpolate the first pixel values by invoking adder 248 to generate residual blocks associated with multiple interpolation filters so that the different residual blocks can be compared to one another to find the best residual block. Motion compensation unit 235 can select the video data that achieves the highest levels of compression. In particular, the selected video data is illustrated as the "resid. block" output of adder 248, which is the final output. Motion compensation unit 235 also generates a first syntax element associated with the first sub-unit of reference video to indicate that the first set of interpolation filters are defined in a syntax element associated with a unit of reference video comprising the first sub-unit of reference video (802). Motion compensation unit 235 encodes the video data based on the first prediction data (803), encodes the first syntax element (804), and encodes the coefficients for the first set of interpolation filters (805).

The encoding of the first prediction data, may for example, include a final output of adder 248 being transformed by transform unit 238, quantized by quantization unit 240, and entropy coded by entropy coding unit 246. The encoding of the first syntax element, may for example, include motion compensation unit 235 forwarding the first syntax element to entropy coding unit 246, and entropy coding unit 246 encoding the first syntax element to form part of the output bitstream. The encoding of the coefficients for the first set of interpolation filters, may for example, include motion compensation unit 235 forwarding information describing the filter coefficients such as the number of possible filters and the length of each filter as well as some or all of the filter coefficients themselves to entropy coding unit 246, and entropy coding unit 246 encoding the information describing the filter coefficients and the filter coefficients to form part of the output bitstream. In this way, the interpolation filter used at video encoder 250 (e.g., the filter coefficients used, or other filter designs or parameters) can be communicated to a destination device so that the destination device can perform the proper interpolation filtering during video reconstruction.

In some examples, the first sub-unit of reference video may be a first frame of the reference video, and the unit of reference video might be a sequence of frames including the first frame of reference video. In such an example, the first syntax element can be included in a frame header (see e.g. sub-unit headers 521, 531, and 541 of FIG. 5) and the first set of coefficients can be included in a sequence header (see e.g. unit header 511 of FIG. 5).

In the same manner as described above for the first pixel values and first syntax element, motion compensation unit 235 can also interpolate second pixel values for a second sub-unit of reference video to generate second prediction data based on a second set of interpolation filters, generate a second syntax element associated with the second sub-unit of reference video to indicate that the second set of interpolation filters are pre-defined, encode the video data based on the second prediction data, and encode the second syntax element. The second sub-unit may, for example, be a frame of reference video, and the second syntax element may be included in a frame header of the frame of reference video.

In the same manner as described above for the first pixel values and first syntax element, motion compensation unit 235 may interpolate third pixel values for a third sub-unit of reference video to generate third prediction data based on a third set of interpolation filters, generate a third syntax element associated with the third sub-unit of reference video to identify that the third set of interpolation filters are to be defined in a header of the third sub-unit of reference video, encode the video data based on the third prediction data, and encode the third syntax element. The third sub-unit may, for example, be a frame of reference video, and the third syntax element may be included in a frame header of the frame of reference video. The frame header for the frame of reference video may additionally include the third set of interpolation filters.

In the same manner as described above for the first pixel values and first syntax element, motion compensation unit 235 can interpolate fourth pixel values for a fourth sub-unit of reference video to generate fourth prediction data based on a fourth set of interpolation filters, generate a fourth syntax element associated with the fourth sub-unit of reference video to identify that the fourth set of interpolation filters are to be defined based on a previous sub-unit of reference video, encode the video data based on the fourth prediction data, and encode the fourth syntax element. The fourth sub-unit may, for example, be a frame of reference video, and the previous sub-unit may be a previous frame of reference video. The fourth syntax element may be included in a frame header of the frame of reference video. The fourth set of interpolation filters are the same set of interpolation filters used by the previous frame of reference video, and may be included in a frame header of the previous frame of reference video, included in a slice header, or part of the pre-defined filters.

Figure 9:
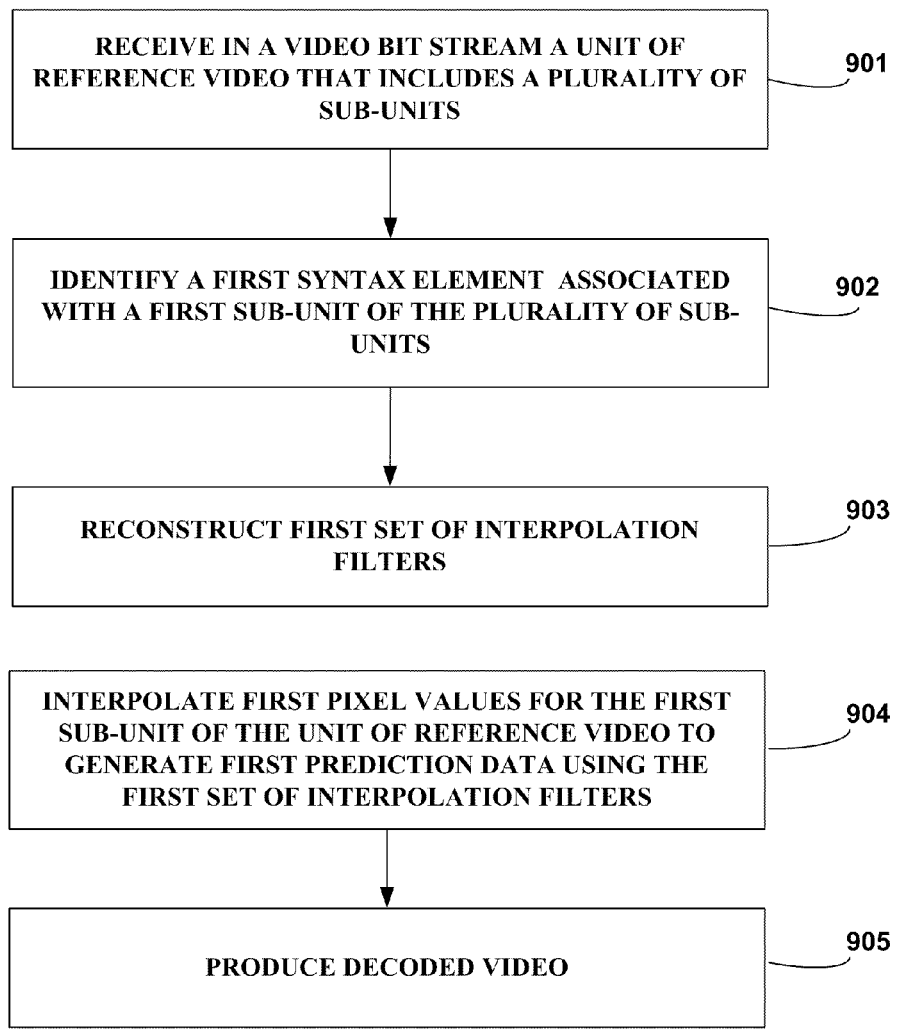

FIG. 9 is a flow diagram illustrating one or more aspects of video decoding consistent with this disclosure. FIG. 9 will be discussed from the perspective of video decoder 360 shown in FIG. 3. In particular, video decoder 360 receives in a video bit stream a unit of reference video that includes a plurality of sub-units (901). Entropy decoding unit 352 may entropy decode the received bitstream to parse out the transformed and quantized residual blocks, which are sent to inverse transform quantization unit 356 and inverse transform unit 358, and to parse out the interpolation syntax element and motion vectors, which are sent to motion compensation unit 355. Within the interpolation syntax, motion compensation unit 355 can identify a first syntax element associated with a first sub-unit of the plurality of sub-units (902). The first syntax element can signify to motion compensation unit 355 that a first set of interpolation filters are defined in a syntax element associated with the unit of reference video. From data in the syntax element associated with the unit of reference video, motion compensation unit 355 can determine the filter coefficients for the first set of interpolation filters and reconstruct the first set of filter coefficients (903). Motion compensation unit 355 interpolates first pixel values for the first sub-unit of the unit of reference video to generate first prediction data using the first set of interpolation filters (904), and from the first prediction data, motion compensation unit 355 produces decoded video (905). In particular, the first prediction data generated by motion compensation unit 355 may be combined with residual data via adder 364 to reconstruct the video data in the pixel domain. The decoded video may then be stored in memory 362 for subsequent use in prediction, and may also be output for presentation to the user, e.g., via a display or other output device. In some example, the first sub-unit of reference video is a first frame of the reference video, and the unit of reference video is a sequence of frames comprising the first frame of reference video.

In the same manner as described above for the first pixel values and a first syntax element, motion compensation unit 355 may identify in the unit of reference a video a second syntax element that is associated with a second sub-unit of the plurality of sub-units and signifies that a second set of interpolation filters are pre-defined, interpolate second pixel values for the second sub-unit of the unit of reference video to generate second prediction data using the first set of interpolation filters; and producing decoded video data based on the second prediction data.

In the same manner as described above for the first pixel values and a first syntax element, motion compensation unit 355 may identify in the unit of reference a video a third syntax element that is associated with a third sub-unit of the plurality of sub-units and signifies that a third set of interpolation filters are to be defined in a header of the third sub-unit of reference video, interpolate third pixel values for the third sub-unit of the unit of reference video to generate third prediction data using the third set of interpolation filters, and produce decoded video data based on the third prediction data. Motion compensation unit 355 can further reconstruct the third set of interpolation filters based on the header of the third sub-unit of reference video.

In the same manner as described above for the first pixel values and a first syntax element, motion compensation unit 355 may identify in the unit of reference a video a fourth syntax element that is associated with a fourth sub-unit of the plurality of sub-units and signifies that a fourth set of interpolation filters are to be defined based on a previous frame of reference video, interpolate fourth pixel values for the fourth sub-unit of the unit of reference video to generate fourth prediction data using the fourth set of interpolation filters, and produce decoded video data based on the fourth prediction data.

The techniques of this disclosure may be embodied in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units, etc.

Accordingly, the techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

Various aspects of the disclosure have been described. These and other aspects are within the scope of the following claims.

What is claimed is:

1. A method of encoding video data, the method comprising:
    interpolating first pixel values for a first sub-unit of reference video included in a unit of reference video to generate a first prediction data, wherein interpolating the first pixel values is based on a first set of interpolation filters;
    identifying a first sub-unit syntax element corresponding to the first set of interpolation filters, the first sub-unit syntax element is identified from multiple syntax elements to be included in a first sub-unit header corresponding to the first sub-unit of reference video and to indicate to a video decoder whether the first sub-unit of reference video is interpolated using a set of interpolation filters identified in a unit header corresponding to the unit of reference video, a set of interpolation filters identified in the first sub-unit header, or a set of interpolation filters used in a previous sub-unit of reference video;
    generating the first sub-unit syntax element that indicates that the first sub-unit of reference video has the first set of interpolation filters defined in the first sub-unit syntax element;
    encoding the video data based at least in part on the first prediction data; and
    generating an encoded bit stream, the encoded bit stream at least comprising the unit header, the first sub-unit header that includes the first sub-unit syntax element, and the encoded video data.

2. The method of claim 1, wherein the first sub-unit of reference video is a first frame of the reference video, the unit of reference video is a sequence of frames comprising the first frame of reference video, the first sub-unit header is a frame header of the first frame of the sequence of frames, and the unit header is a sequence header of the sequence of frames.

3. The method of claim 1, further comprising:
    encoding data for reconstructing the first set of interpolation filters; and
    including into the encoded bit stream the encoded data for reconstructing the first set of interpolation filters.

4. The method of claim 1, further comprising:
    interpolating second pixel values for a second sub-unit of reference video to generate second prediction data, wherein interpolating the second pixel values is based on a second set of interpolation filters;
    generating a second sub-unit syntax element associated with the second sub-unit of reference video, the second sub-unit syntax element being identified from the multiple syntax elements to indicate to the video decoder that the second set of interpolation filters comprises a pre-defined set of switched interpolation filters;
    encoding the video data based at least in part on the second prediction data; and
    generating the encoded bit stream to at least comprise the encoded video data and the second sub-unit syntax element in a second sub-unit header of the second sub-unit of reference video.

5. The method of claim 4, wherein the pre-defined set of switched interpolation filters comprises a fixed set of switched interpolation filters.

6. The method of claim 1, further comprising:
    interpolating second pixel values for a second sub-unit of reference video to generate second prediction data, wherein interpolating the second pixel values is based on a second set of interpolation filters;
    generating a second sub-unit syntax element associated with the second sub-unit of reference video, the second sub-unit syntax element being identified from the multiple syntax elements to indicate to the video decoder that the second set of interpolation filters is defined in a second sub-unit header corresponding to the second sub-unit of reference video;
    encoding the video data based at least in part on the second prediction data; and
    generating the encoded bit stream to at least comprise the encoded video data and the second sub-unit syntax element in the second sub-unit header of the second sub-unit of reference video.

7. The method of claim 6, further comprising:
    encoding data for reconstructing the second set of interpolation filters; and
    including into the encoded bit stream the encoded data for reconstructing the second set of interpolation filters.

8. The method of claim 1, further comprising:
    interpolating second pixel values for a second sub-unit of reference video to generate second prediction data, wherein interpolating the second pixel values is based on a second set of interpolation filters;
    generating a second sub-unit syntax element associated with the second sub-unit of reference video, the second sub-unit syntax element being identified from the multiple syntax elements to indicate to the video decoder that the second set of interpolation filters is defined based on the previous sub-unit of reference video;
    encoding the video data based at least in part on the second prediction data; and
    generating the encoded bit stream to at least comprise the encoded video data and the second sub-unit syntax element in a second sub-unit header of the second sub-unit of reference video.

9. The method of claim 1, wherein information associated with the set of interpolation filters identified in the first sub-unit header corresponding to the first sub-unit of reference video comprises at least one of number of filters, length of each filter, or filter coefficients.

10. The method of claim 1, wherein the the set of interpolation filters identified in the first sub-unit header corresponding to the first sub-unit of reference video comprises an adaptive set of filters analytically derived for a specific scene.

11. A method of decoding video data, the method comprising:
- receiving in a video bit stream a unit of reference video, wherein the unit of reference video comprises at least a unit header, a plurality of sub-units of reference video, and a first sub-unit header associated with a first sub-unit of the plurality of sub-units of reference video, wherein the first sub-unit header includes a first sub-unit syntax element identified from multiple syntax elements to indicate whether the first sub-unit of reference video is interpolated using a set of interpolation filters identified in the unit header, a set of interpolation filters identified in the first sub-unit header, or a set of interpolation filters used in a previous sub-unit of reference video;
- identifying in the unit of reference video the first sub-unit syntax element;

interpolating first pixel values for the first sub-unit of reference video to generate first prediction data using a first set of interpolation filters identified by the first sub-unit syntax element; and
- decoding the video data received in the video bit stream based at least in part on the first prediction data.

12. The method of claim 11, wherein the first sub-unit of the unit of reference video is a first frame of the reference video, the unit of reference video is a sequence of frames comprising the first frame of reference video, the first sub-unit header is a frame header of the first frame of the sequence of frames, and the unit header is a sequence header of the sequence of frames.

13. The method of claim 11, further comprising:
- reconstructing the first set of interpolation filters based at least in part on the first sub-unit syntax element.

14. The method of claim 11, further comprising:
- identifying in the unit of reference video a second sub-unit syntax element, wherein the second sub-unit syntax element is included in a second sub-unit header associated with a second sub-unit of the plurality of sub-units of reference video, and wherein the second sub-unit syntax element is identified from the multiple syntax elements to indicate that a second set of interpolation filters used with the second sub-unit of reference video comprises a pre-defined set of switched interpolation filters;
- interpolating second pixel values for the second sub-unit of reference video to generate second prediction data using the second set of interpolation filters indicated by the second sub-unit syntax element; and
- decoding the video data received in the video bit stream based at least in part on the second prediction data.

15. The method of claim 11, further comprising:
- identifying in the unit of reference video a second sub-unit syntax element, wherein the second sub-unit syntax element is included in a second sub-unit header associated with a second sub-unit of the plurality of sub-units of reference video, and wherein the second sub-unit syntax element is identified from the multiple syntax elements to indicate that a second set of interpolation filters used with the second sub-unit of reference video is defined in the second sub-unit header;
- interpolating second pixel values for the second sub-unit of reference video to generate second prediction data using the second set of interpolation filters indicated by the second sub-unit syntax element; and
- decoding the video data received in the video bit stream based at least in part on the second prediction data.

16. The method of claim 15, further comprising:
- reconstructing the second set of interpolation filters based at least in part on the second sub-unit syntax element.

17. The method of claim 11, further comprising:
- identifying in the unit of reference video a second sub-unit syntax element, wherein the second syntax element is included in a second sub-unit header associated with a second sub-unit of the plurality of sub-units of reference video, and wherein the second sub-unit syntax element is identified from the multiple syntax elements to indicate that a second set of interpolation filters used with the second sub-unit of reference video is defined based on the previous sub-unit of reference video;
- interpolating second pixel values for the second sub-unit of reference video to generate second prediction data using the second set of interpolation filters indicated by the second sub-unit syntax element; and
- decoding the video data received in the video bit stream based at least in part on the second prediction data.

18. An apparatus that encodes video data, the apparatus comprising:
- a video encoder configured to:
- interpolate first pixel values for a first sub-unit of reference video included in a unit of reference video to generate a first prediction data, wherein interpolating the first pixel values is based on a first set of interpolation filters;
- identify a first sub-unit syntax element corresponding to the first set of interpolation filters, the first sub-unit syntax element is identified from multiple syntax elements to be included in a first sub-unit header corresponding to the first sub-unit of reference video and to indicate to a video decoder whether the first sub-unit of reference video is interpolated using a set of interpolation filters identified in a unit header corresponding to the unit of reference video, a set of interpolation filters identified in the first sub-unit header, or a set of interpolation filters used in a previous sub-unit of reference video;
- generate the first sub-unit syntax element that indicates that the first sub-unit of reference video has the first set of interpolation filters defined in the first sub-unit syntax element;
- encode the video data based at least in part on the first prediction data; and
- generate an encoded bit stream, the encoded bit stream at least comprising the unit header, the first sub-unit header that includes the first sub-unit syntax element, and the encoded video data.

19. The apparatus of claim 18, wherein the first sub-unit of reference video is a first frame of the reference video, the unit of reference video is a sequence of frames comprising the first frame of reference video, the first sub-unit header is a frame header of the first frame of the sequence of frames, and the unit header is a sequence header of the sequence of frames.

20. The apparatus of claim 18, wherein the video encoder is further configured to:
- encode data for reconstructing the first set of interpolation filters; and
- include into the encoded bit stream the encoded data for reconstructing the first set of interpolation filters.

21. The apparatus of claim 18, wherein the video encoder is further configured to:
- interpolate second pixel values for a second sub-unit of reference video to generate second prediction data, wherein interpolating the second pixel values is based on a second set of interpolation filters;
- generate a second sub-unit syntax element associated with the second sub-unit of reference video, the second sub-unit syntax element being identified from the multiple syntax elements to indicate that the second set of interpolation filters comprises a pre-defined set of switched interpolation filters;
encode the video data based at least in part on the second prediction data; and
generate the encoded bit stream to at least comprise the encoded video data and the second sub-unit syntax element in a second sub-unit header of the second sub-unit of reference video.

22. The device of claim 21, wherein the pre-defined set of switched interpolation filters comprises a fixed set of switched interpolation filters.

23. The apparatus of claim 18, wherein the video encoder is further configured to:
interpolate second pixel values for a second sub-unit of reference video to generate second prediction data, wherein interpolating the second pixel values is based on a second set of interpolation filters;
generate a second sub-unit syntax element associated with the second sub-unit of reference video, the second sub-unit syntax element being identified from the multiple syntax elements to indicate to the video decoder that the second set of interpolation filters is defined in a second sub-unit header corresponding to the second sub-unit of reference video;
encode the video data based at least in part on the second prediction data; and
generate encoded bit stream to at least comprise the encoded video data and the second sub-unit syntax element in the second sub-unit header of the second sub-unit of reference video.

24. The apparatus of claim 23, wherein the video encoder is further configured to:
encode data for reconstructing the second set of interpolation filters; and
include into the encoded bit stream the encoded data for restructuring the second set of interpolation filters.

25. The apparatus of claim 18, wherein the video encoder is further configured to:
interpolate second pixel values for a second sub-unit of reference video to generate second prediction data, wherein interpolating the second pixel values is based on a second set of interpolation filters;
generate a second sub-unit syntax element associated with the second sub-unit of reference video, the second sub-unit syntax element being identified from the multiple syntax elements to indicate to the video decoder that the second set of interpolation filters is defined based on the previous sub-unit of reference video;
encode the video data based at least in part on the second prediction data; and
generate the encoded bit stream to at least comprise the encoded video data and the second sub-unit syntax element in a second sub-unit header of the second sub-unit of reference video.

26. The device of claim 18, wherein information associated with the set of interpolation filters identified in the first sub-unit header corresponding to the first sub-unit of reference video comprises at least one of number of filters, length of each filter, or filter coefficients.

27. The device of claim 18, wherein the the set of interpolation filters identified in the first sub-unit header corresponding to the first sub-unit of reference video comprises an adaptive set of filters analytically derived for a specific scene.

28. An apparatus that decodes video data, the apparatus comprising:
a video decoder configured to:
receive in a video bit stream a unit of reference video, wherein the unit of reference video comprises at least a unit header, a plurality of sub-unit of reference video, and a first sub-unit header associated with a first sub-unit of the plurality of sub-units of reference video, wherein the first sub-unit header includes a first sub-unit syntax element identified from multiple syntax elements to indicate whether the first sub-unit of reference video is interpolated using a set of interpolation filters identified in the unit header, a set of interpolation filters identified in the first sub-unit header, or a set of interpolation filters used in a previous sub-unit of reference video; identify in the unit of reference video the first sub-unit syntax element;
interpolate first pixel values for the first sub-unit of reference video to generate first prediction data using a first set of interpolation filters identified by the first sub-unit syntax element; and
produce decoded video data from the received video bit stream based at least in part on the first prediction data.

29. The apparatus of claim 28, wherein the first sub-unit of reference video is a first frame of the reference video, the unit of reference video is a sequence of frames comprising the first frame of reference video, the first sub-unit header is a frame header of the first frame of the sequence of frames, and the unit header is a sequence header of the sequence of frames.

30. The apparatus of claim 28, wherein the video decoder is further configured to:
reconstruct the first set of interpolation filters based at least in part on the first sub-unit syntax element.

31. The apparatus of claim 28, wherein the video decoder is further configured to:
identify in the unit of reference video a second sub-unit syntax element, wherein the second sub-unit syntax element is included in a second sub-unit header associated with a second sub-unit of the plurality of sub-units of reference video, and wherein the second sub-unit syntax element is identified from the multiple syntax elements to indicate that a second set of interpolation filters used with the second sub-unit of reference video comprises a pre-defined set of switched interpolation filters;
interpolate second pixel values for the second sub-unit of reference video to generate second prediction data using the second set of interpolation filters indicated by the second sub-unit syntax element; and
produce decoded video data from the received video bit stream based at least in part on the second prediction data.

32. The apparatus of claim 28, wherein the video decoder is further configured to:
identify in the unit of reference video a second sub-unit syntax element, wherein the second sub-unit syntax element is included in a second sub-unit header associated with a second sub-unit of the plurality of sub-units of reference video, and wherein the second sub-unit syntax element is identified from the multiple syntax elements to indicate that a second set of interpolation filters used with the second sub-unit of reference video is defined in the second sub-unit header;
interpolate second pixel values for the second sub-unit of reference video to generate second prediction data using the second set of interpolation filters indicated by the second sub-unit syntax element; and
produce decoded video data from the received video bit stream based at least in part on the second prediction data.

33. The apparatus of claim 32, wherein the video decoder is further configured to:
reconstruct the second set of interpolation filters based at least in part on the second sub-unit syntax element.

34. The apparatus of claim 28, wherein the video decoder is further configured to:
identify in the unit of reference video a second sub-unit syntax element, wherein the second syntax element is included in a second sub-unit header associated with a second sub-unit of the plurality of sub-units of reference video, and wherein the second sub-unit syntax element is identified from the multiple syntax elements to indicate that a second set of interpolation filters used with the second sub-unit of reference video is defined based on the previous sub-unit of reference video;
interpolate second pixel values for the second sub-unit of reference video to generate second prediction data using the second set of interpolation filters indicated by the second sub-unit syntax element; and,
produce decoded video data from the received video bit stream based at least in part on the second prediction data.

35. A non-transitory computer-readable storage medium comprising instructions that upon execution in a processor cause the processor to:
interpolate first pixel values for a first sub-unit of reference video included in a unit of reference video to generate a first prediction data, wherein interpolating the first pixel values is based on a first set of interpolation filters;
identify a first sub-unit syntax element corresponding to the first set of interpolation filters, the first sub-unit syntax element is identified from multiple syntax elements to be included in a first sub-unit header corresponding to the first sub-unit of reference video and to indicate to a video decoder whether the first sub-unit of reference video is interpolated using a set of interpolation filters identified in a unit header corresponding to the unit of reference video, a set of interpolation filters identified in the first sub-unit header, or a set of interpolation filters used in a previous sub-unit of reference video;
generate the first sub-unit syntax element that indicates that the first sub-unit of reference video has the first set of interpolation filters defined in the first sub-unit syntax element;
encode the video data based at least in part on the first prediction data; and
generate an encoded bit stream, the encoded bit stream at least comprising the unit header, the first sub-unit header that includes the first sub-unit syntax element, and the encoded video data.

36. The non-transitory computer-readable storage medium of claim 35, wherein the first sub-unit of reference video is a first frame of the reference video, the unit of reference video is a sequence of frames comprising the first frame of reference video, the first sub-unit header is a frame header of the first frame of the sequence of frames, and the unit header is a sequence header of the sequence of frames.

37. The non-transitory computer-readable storage medium of claim 35, further comprising instructions that upon execution in the processor cause the processor to:
encode data for reconstructing the first set of interpolation filters; and
include into the encoded bit stream the encoded data for reconstructing the first set of interpolation filters.

38. The non-transitory computer-readable storage medium of claim 35, further comprising instructions that upon execution in the processor cause the processor to:
interpolate second pixel values for a second sub-unit of reference video to generate second prediction data, wherein interpolating the second pixel values is based on a second set of interpolation filters;
generate a second sub-unit syntax element associated with the second sub-unit of reference video, the second sub-unit syntax element being identified from the multiple syntax elements to indicate to the video decoder that the second set of interpolation filters comprises a pre-defined set of switched interpolation filters;
encode the video data based at least in part on the second prediction data; and
generate the encoded bit stream to at least comprise the encoded video data and the second sub-unit syntax element in a second sub-unit header of the second sub-unit of reference video.

39. The non-transitory computer-readable storage medium of claim 35, further comprising instructions that upon execution in the processor cause the processor to:
interpolate second pixel values for a second sub-unit of reference video to generate second prediction data, wherein interpolating the second pixel values is based on a second set of interpolation filters;
generate a second sub-unit syntax element associated with the second sub-unit of reference video, the second sub-unit syntax element being identified from the multiple syntax elements to indicate to the video decoder that the second set of interpolation filters are is defined in a second sub-unit header corresponding to the second sub-unit of reference video;
encode the video data based at least in part on the second prediction data; and
generate the encoded bit stream to at least comprise the encoded video data and the second sub-unit syntax element in the second sub-unit header of the second sub-unit of reference video.

40. The non-transitory computer-readable storage medium of claim 39, further comprising instructions that upon execution in the processor cause the processor to:
encode data for reconstructing the second set of interpolation filters; and
include into the encoded bit stream the encoded data for reconstructing the second set of interpolation filters.

41. The non-transitory computer-readable storage medium of claim 35, further comprising instructions that upon execution in the processor cause the processor to:
interpolate second pixel values for a second sub-unit of reference video to generate second prediction data, wherein interpolating the second pixel values is based on a second set of interpolation filters;
generate a second sub-unit syntax element associated with the second sub-unit of reference video, the second sub-unit syntax element being identified from the multiple syntax elements to indicate to the video decoder that the second set of interpolation filters is defined based on the previous sub-unit of reference video;
encode the video data based at least in part on the second prediction data; and
generate the encoded bit stream to at least comprise the encoded video data and the second sub-unit syntax element in a second sub-unit header of the second sub-unit of reference video.

42. A non-transitory computer-readable storage medium comprising instructions that upon execution in a processor cause the processor to:

receive in a video bit stream a unit of reference video, wherein the unit of reference video comprises at least a unit header, a plurality of sub-units of reference video, and a first sub-unit header associated with a first sub-unit of the plurality of sub-units of reference video, wherein the first sub-unit header includes a first sub-unit syntax element identified from multiple syntax elements to indicate whether the first sub-unit of reference video is interpolated using a set of interpolation filters identified in the unit header, a set of interpolation filters identified in the first sub-unit header, or a set of interpolation filters used in a previous sub-unit of reference video; identify in the unit of reference video the first sub-unit syntax element;

interpolate first pixel values for the first sub-unit of reference video to generate first prediction data using a first set of interpolation filters identified by the first sub-unit syntax element; and decode the video data received in the video bit stream based at least in part on the first prediction data.

43. The non-transitory computer-readable storage medium of claim 42, wherein the first sub-unit of the unit of reference video is a first frame of the reference video, the unit of reference video is a sequence of frames comprising the first frame of reference video, the first sub-unit header is a frame header of the first frame of the sequence of frames, and the unit header is a sequence header of the sequence of frames.

44. The non-transitory computer-readable storage medium of claim 42, further comprising instructions that upon execution in the processor cause the processor to:

reconstruct the first set of interpolation filters based at least in part on the first sub-unit syntax element.

45. The non-transitory computer-readable storage medium of claim 42, further comprising instructions that upon execution in the processor cause the processor to:

identify in the unit of reference video a second sub-unit syntax element, wherein the second sub-unit syntax element is included in a second sub-unit header associated with a second sub-unit of the plurality of sub-units of reference video, and wherein the second sub-unit syntax element is identified from the multiple syntax elements to indicate that a second set of interpolation filters used with the second sub-unit of reference video comprises a pre-defined set of switched interpolation filters;

interpolate second pixel values for the second sub-unit of reference video to generate second prediction data using the second set of interpolation filters indicated by the second sub-unit syntax element; and decode the video data from the received video bit stream based at least in part on the second prediction data.

46. The non-transitory computer-readable storage medium of claim 42, further comprising instructions that upon execution in the processor cause the processor to:

identify in the unit of reference video a second sub-unit syntax element, wherein the second sub-unit syntax element is included in a second sub-unit header associated with a second sub-unit of the plurality of sub-units of reference video, and wherein the second sub-unit syntax element is identified from the multiple syntax elements to indicate that a second set of interpolation filters used with the second sub-unit of reference video is defined in the second sub-unit header;

interpolate second pixel values for the second sub-unit of reference video to generate second prediction data using the second set of interpolation filters indicated by the second sub-unit syntax element; and decode the video data from the received video bit stream based at least in part on the second prediction data.

47. The non-transitory computer-readable storage medium of claim 46, further comprising instructions that upon execution in the processor cause the processor to:

reconstruct the second set of interpolation filters based on the second sub-unit syntax element.

48. The non-transitory computer-readable storage medium of claim 42, further comprising instructions that upon execution in the processor cause the processor to:

identify in the unit of reference video a second sub-unit syntax element, wherein the second syntax element is included in a second sub-unit header associated with a second sub-unit of the plurality of sub-units of reference video, and wherein the second sub-unit syntax element is identified from the multiple syntax elements to indicate that a second set of interpolation filters used with the second sub-unit of reference video is defined based on the previous sub-unit of reference video;

interpolate second pixel values for the second sub-unit of reference video to generate second prediction data using the second set of interpolation filters indicated by the second sub-unit syntax element; and decode the video data from the received video bit stream based at least in part on the second prediction data.

49. A device for encoding video data, the device comprising:

means for interpolating first pixel values for a first sub-unit of reference video included in a unit of reference video to generate a first prediction data, wherein interpolating the first pixel values is based on a first set of interpolation filters;

means for identifying a first sub-unit syntax element corresponding to the first set of interpolation filters, the first sub-unit syntax element is identified from multiple syntax elements to be included in a first sub-unit header corresponding to the first sub-unit of reference video and to indicate to a video decoder whether the first sub-unit of reference video is interpolated using a set of interpolation filters identified in a unit header corresponding to the unit of reference video, a set of interpolation filters identified in the first sub-unit header, or a set of interpolation filters used in a previous sub-unit of reference video;

means for generating the first sub-unit syntax element that indicates that the first sub-unit of reference video has the first set of interpolation filters defined in the first sub-unit syntax element;

means for encoding the video data based at least in part on the first prediction data; and means for generating an encoded bit stream, the encoded bit stream at least comprising the header, the first sub-unit header that includes the first sub-unit syntax element, and the encoded video data.

50. The device of claim 49, wherein the first sub-unit of reference video is a first frame of the reference video, the unit of reference video is a sequence of frames comprising the first frame of reference video, the first sub-unit header is a frame header of the first frame of the sequence of frames, and the unit header is a sequence header of the sequence of frames.

51. The device of claim 49, wherein:

the means for encoding comprises means for encoding data for reconstructing the first set of interpolation filters; and the means for generating comprises means for including into the encoded bit stream the encoded data for reconstructing the first set of interpolation filters.

52. The device of claim 49, further comprising:
means for interpolating second pixel values for a second sub-unit of reference video to generate second prediction data, wherein interpolating the second pixel values is based on a second set of interpolation filters;
means for generating a second sub-unit syntax element associated with the second sub-unit of reference video, the second sub-unit syntax element being identified from the multiple syntax elements to indicate to the video decoder that the second set of interpolation filters comprises a pre-defined set of switched interpolation filters;
means for encoding the video data based at least in part on the second prediction data; and
means for generating the encoded bit stream to at least comprise the encoded video data and the second sub-unit syntax element in a second sub-unit header of the second sub-unit of reference video.

53. The device of claim 49, further comprising:
means for interpolating second pixel values for a second sub-unit of reference video to generate second prediction data, wherein interpolating the second pixel values is based on a second set of interpolation filters;
means for generating a second sub-unit syntax element associated with the second sub-unit of reference video, the second sub-unit syntax element being identified from the multiple syntax elements to indicate to the video decoder that the second set of interpolation filters is defined in a second sub-unit header corresponding to the second sub-unit of reference video;
means for encoding the video data based at least in part on the second prediction data; and
means for generating the encoded bit stream to at least comprise the encoded video data and the second sub-unit syntax element in the second sub-unit header of the second sub-unit of reference video.

54. The device of claim 53, wherein:
the means for encoding comprises means for encoding data for reconstructing the second set of interpolation filters; and
the means for generating comprises means for including into the encoded bit stream the encoded data for reconstructing the second set of interpolation filters.

55. The device of claim 49, further comprising:
means for interpolating second pixel values for a second sub-unit of reference video to generate second prediction data, wherein interpolating the second pixel values is based on a second set of interpolation filters;
means for generating a second sub-unit syntax element associated with the second sub-unit of reference video, the second sub-unit syntax element being identified from the multiple syntax elements to indicate to the video decoder that the second set of interpolation filters is defined based on the previous sub-unit of reference video;
means for encoding the video data based at least in part on the second prediction data; and
means for generating the encoded bit stream to at least comprise the encoded video data and the second sub-unit syntax element in a second sub-unit header of the second sub-unit reference video.

56. A device for decoding video data, the device comprising:
means for receiving in a video bit stream a unit of reference video, wherein the unit of reference video comprises at least a unit header, a plurality of sub-units of reference video, and a first sub-unit header associated with a first sub-unit of the plurality of sub-units of reference video, wherein the first sub-unit header includes a first sub-unit syntax element identified from multiple syntax elements to indicate whether the first sub-unit of reference video is interpolated using a set of interpolation filters identified in the unit header, a set of interpolation filters identified in the first sub-unit header, or a set of interpolation filters used in a previous sub-unit of reference video;
means for identifying in the unit of reference video the first sub-unit syntax element; means for interpolating first pixel values for the first sub-unit of reference video to generate first prediction data using a first set of interpolation filters identified by the first sub-unit syntax element; and
means for decoding the video data received in the video bit stream based at least in part on the first prediction data.

57. The device of claim 56, wherein the first sub-unit of the unit of reference video is a first frame of the reference video, the unit of reference video is a sequence of frames comprising the first frame of reference video, the first sub-unit header is a frame header of the first frame of the sequence of frames, and the unit header is a sequence header of the sequence of frames.

58. The device of claim 56, further comprising:
means for reconstructing the first set of interpolation filters based on the first sub-unit syntax element.

59. The device of claim 56, further comprising:
means for identifying in the unit of reference video a second sub-unit syntax element, wherein the second sub-unit syntax element is included in a second sub-unit header associated with a second sub-unit of the plurality of sub-units of reference video, and wherein the second sub-unit syntax element is identified from the multiple syntax elements to indicate that a second set of interpolation filters used with the second sub-unit of reference video comprises a pre-defined set of switched interpolation filters;
means for interpolating second pixel values for the second sub-unit of reference video to generate second prediction data using the second set of interpolation filters indicated by the second sub-unit syntax element; and
means for decoding the video data received in the video bit stream based at least in part on the second prediction data.

60. The device of claim 56, further comprising:
means for identifying in the unit of reference video a second sub-unit syntax element, wherein the second sub-unit syntax element is included in a second sub-unit header associated with a second sub-unit of the plurality of sub-units of reference video, and wherein the second sub-unit syntax element is identified from the multiple syntax elements to indicate that a second set of interpolation filters used with the second sub-unit of reference video is defined in the second sub-unit header;
means for interpolating second pixel values for the second sub-unit of reference video to generate second prediction data using the second set of interpolation filters indicated by the second sub-unit syntax element; and
means for decoding the video data received in the video bit stream based at least in part on the second prediction data.

61. The device of claim 60, further comprising:
means for reconstructing the second set of interpolation filters based at least in part on the second sub-unit syntax element.

62. The device of claim 56, further comprising:
means for identifying in the unit of reference video a second sub-unit syntax element, wherein the second syntax element is included in a second sub-unit header associated with a second sub-unit of the plurality of sub-units of reference video, and wherein the second sub-unit syntax element is identified from the multiple syntax elements to indicate that a second set of interpolation filters used with the second sub-unit of reference video is defined based on the previous sub-unit of reference video;
means for interpolating second pixel values for the second sub-unit of reference video to generate second prediction data using the second set of interpolation filters indicated by the second sub-unit syntax element; and
means for decoding the video data received in the video bit stream based at least in part on the second prediction data.

* * * * *